United States Patent
Hori et al.

(10) Patent No.: US 9,865,885 B2
(45) Date of Patent: Jan. 9, 2018

(54) MANUFACTURING METHOD OF CATALYST INK, MANUFACTURING METHOD OF FUEL CELL, AND FUEL CELL

(75) Inventors: Yoshihiro Hori, Nisshin (JP); Yoshito Endou, St. Paul, MN (US); Sozaburo Ohashi, Nagoya (JP); Noriaki Ishihara, Toyota (JP); Masao Okumura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 564 days.

(21) Appl. No.: 14/241,238

(22) PCT Filed: May 14, 2012

(86) PCT No.: PCT/JP2012/003139
§ 371 (c)(1),
(2), (4) Date: Feb. 26, 2014

(87) PCT Pub. No.: WO2013/031060
PCT Pub. Date: Mar. 7, 2013

(65) Prior Publication Data
US 2014/0205932 A1    Jul. 24, 2014

(30) Foreign Application Priority Data

Aug. 31, 2011 (WO) .................. PCT/JP2011/004849

(51) Int. Cl.
*H01M 4/88* (2006.01)
*H01M 4/92* (2006.01)
(Continued)

(52) U.S. Cl.
CPC ......... *H01M 4/926* (2013.01); *H01M 4/8668* (2013.01); *H01M 4/8828* (2013.01); *H01M 4/925* (2013.01); *H01M 2008/1095* (2013.01)

(58) Field of Classification Search
None
See application file for complete search history.

(56) References Cited

U.S. PATENT DOCUMENTS 5,582,484 A    12/1996    Asa
2001/0024748 A1    9/2001    Mizuno et al.
(Continued)

FOREIGN PATENT DOCUMENTS

CN    101946360 A    1/2011
EP    1535950 A1    6/2005
(Continued)

OTHER PUBLICATIONS

Definition of "gel," Merriam-Webster's Online [online] <URL: https://www.merriam-webster.com/dictionary/gel>, retrieved on Jan. 23, 2017.*

(Continued)

*Primary Examiner* — Jonathan Crepeau
(74) *Attorney, Agent, or Firm* — Andrews Kurth Kenyon LLP

(57) ABSTRACT

A catalyst ink for improving the performance of catalyst electrodes in a fuel cell is produced by the following procedure. A catalyst dispersion is prepared by dispersing catalyst-supported particles as conductive particles with a catalyst supported thereon in a solvent. A gel material having viscoelasticity is prepared by mixing an ionomer with a volatile solvent. A catalyst ink having a desired viscosity is produced by stirring and mixing the catalyst dispersion with the gel material.

16 Claims, 24 Drawing Sheets

(51) Int. Cl.
*H01M 4/86* (2006.01)
*H01M 8/1018* (2016.01)

(56) References Cited

U.S. PATENT DOCUMENTS

| | | |
|---|---|---|
| 2010/0330463 A1 | 12/2010 | Jang et al. |
| 2011/0262828 A1 | 10/2011 | Noda et al. |
| 2012/0183878 A1 | 7/2012 | Okada et al. |
| 2013/0045864 A1 | 2/2013 | Kato |

FOREIGN PATENT DOCUMENTS

| | | |
|---|---|---|
| JP | H09-075698 A | 3/1997 |
| JP | 2001-266901 A | 9/2001 |
| JP | 2007-095364 A | 4/2007 |
| JP | 2010-531533 A | 9/2010 |
| JP | 2010-257929 A | 11/2010 |
| JP | 2011-034678 A | 2/2011 |
| JP | 2011-159517 A | 8/2011 |
| JP | 2011159624 A | 8/2011 |
| WO | 2011-040060 A1 | 4/2011 |
| WO | 2011-083842 A1 | 7/2011 |

OTHER PUBLICATIONS

"Viscosity Tables," V&P Scientific,Inc. [online] <URL: http://www.vp-scientific.com/Viscosity_Tables.htm>, retrieved on Jan. 23, 2017.*

* cited by examiner

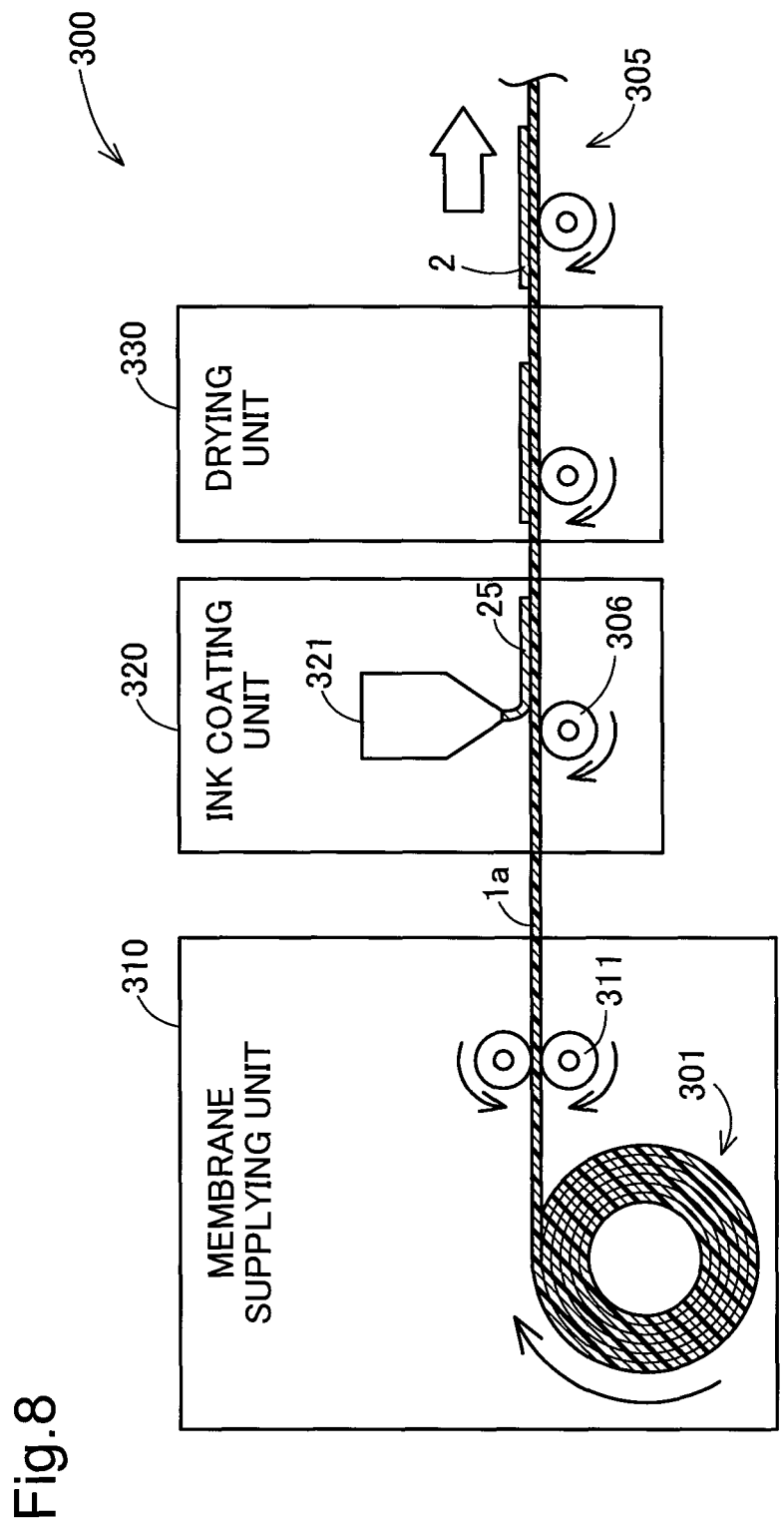

Fig.10
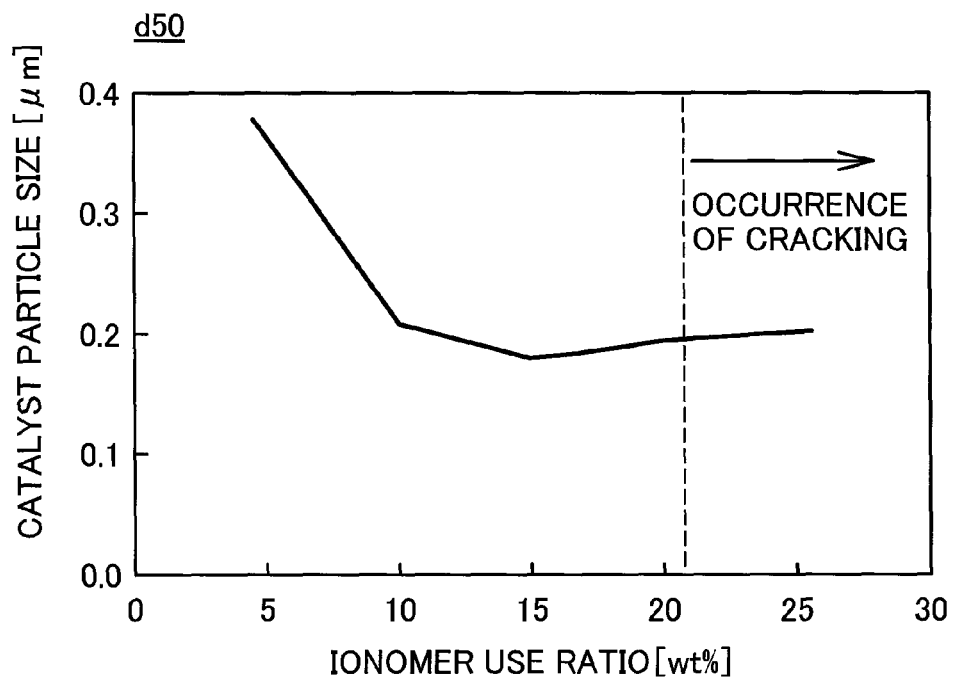
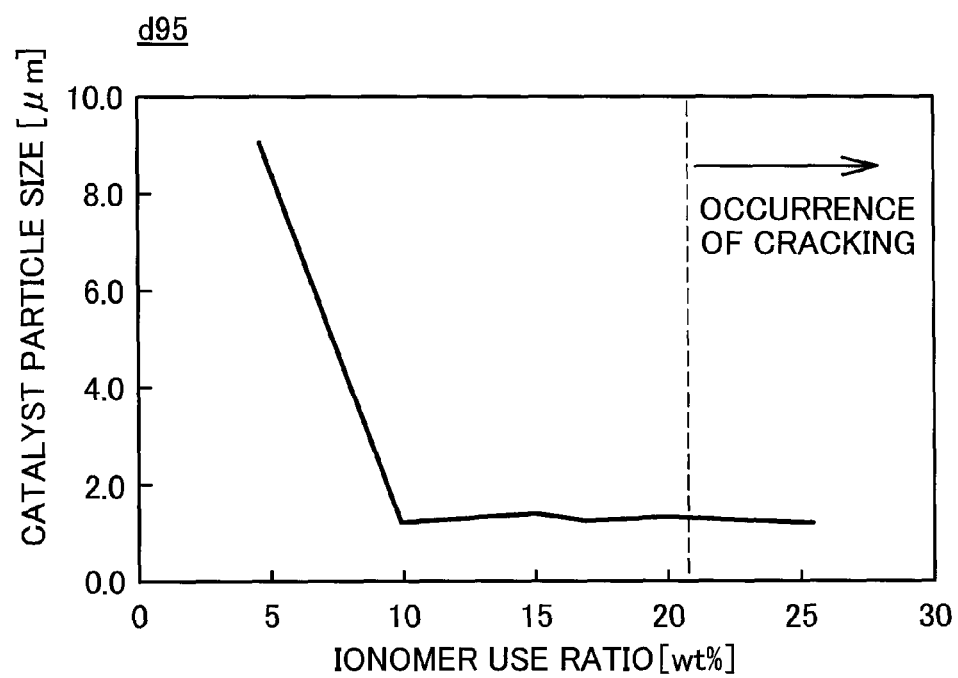

Fig.11
STORAGE MODULUS OF GEL MATERIAL G1= 100 [Pa]
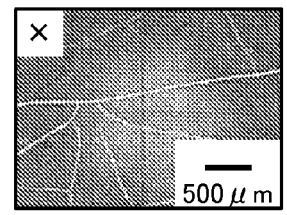
STORAGE MODULUS OF GEL MATERIAL G1= 150 [Pa]
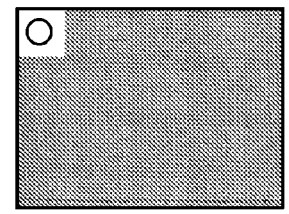
STORAGE MODULUS OF GEL MATERIAL G1= 200 [Pa]
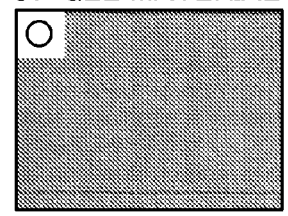
STORAGE MODULUS OF GEL MATERIAL G1= 400 [Pa]
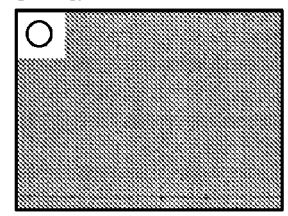
STORAGE MODULUS OF GEL MATERIAL G1= 450 [Pa]
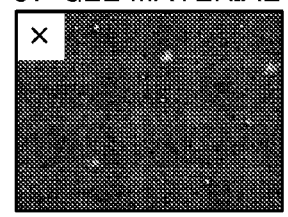

Fig.22
STORAGE MODULUS 100 TO 300 [Pa]
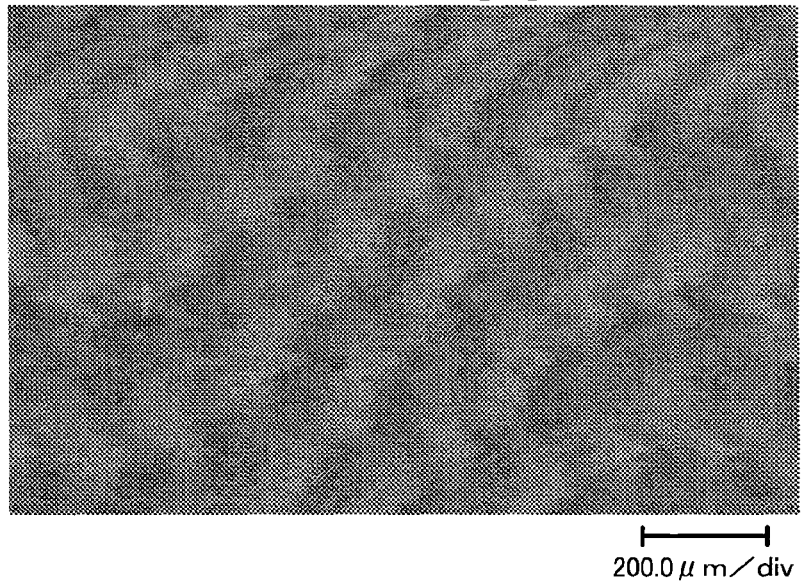
200.0 μm/div
STORAGE MODULUS 350 [Pa]
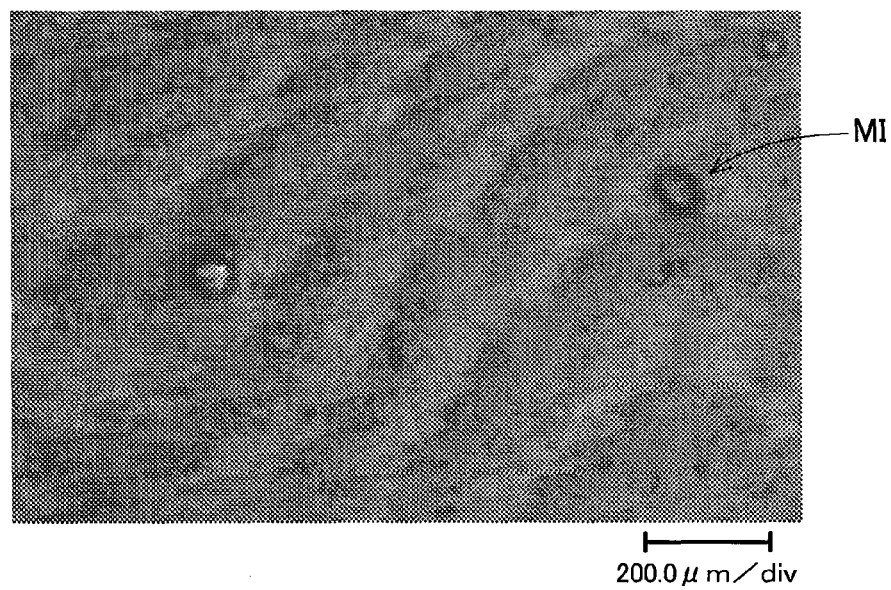
MI
200.0 μm/div

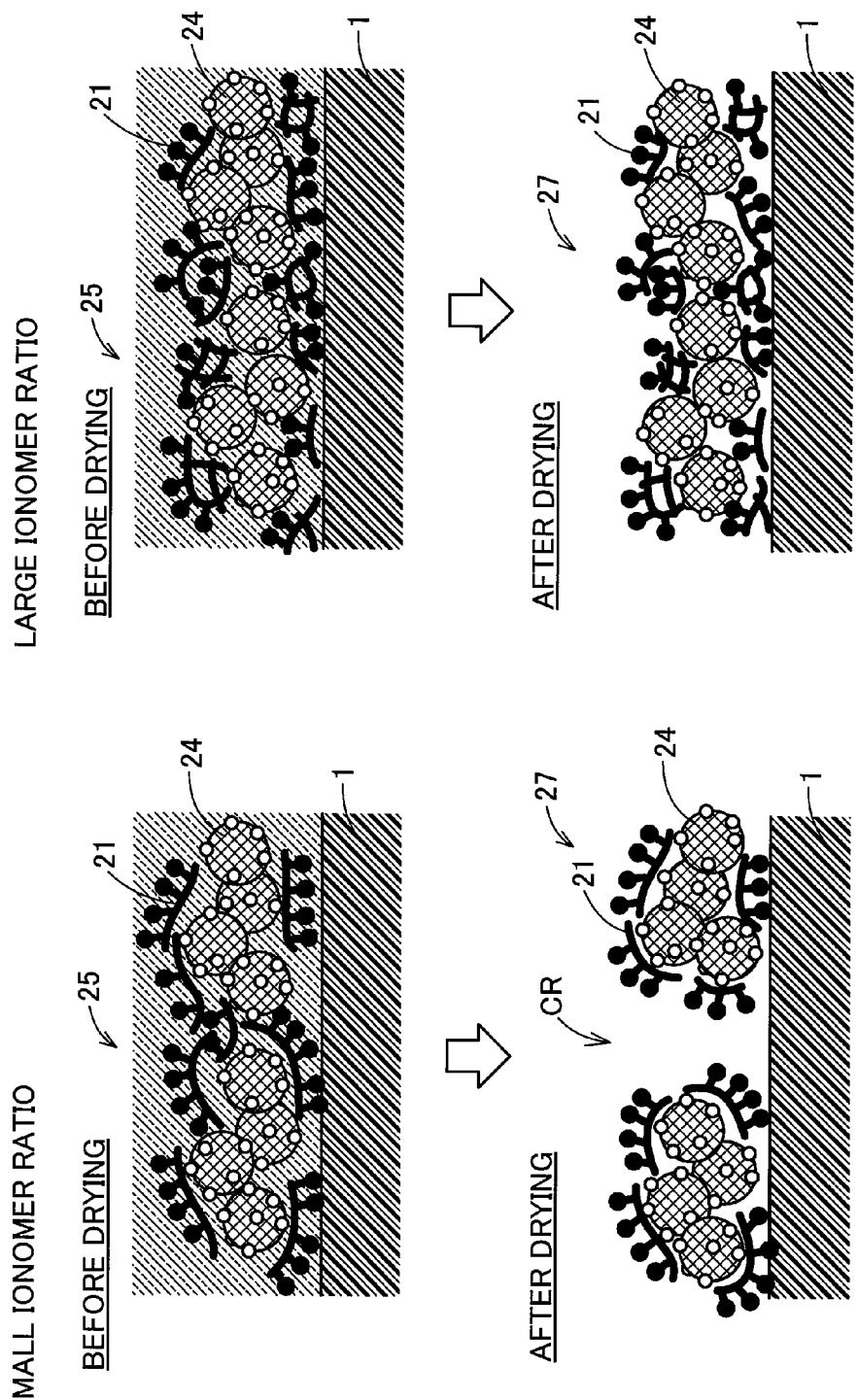

us 9,865,885 B2

MANUFACTURING METHOD OF CATALYST INK, MANUFACTURING METHOD OF FUEL CELL, AND FUEL CELL

CROSS REFERENCE TO RELATED APPLICATION

This is a national phase application based on the PCT International Patent Application No. PCT/JP2012/003139 filed on May 14, 2012, claiming priority to PCT International Patent Application No. PCT/JP2011/004849 filed Aug. 31, 2011, the entire contents of both of which are incorporated herein by reference.

TECHNICAL FIELD

The present invention relates to catalyst electrodes with a catalyst supported therein and a fuel cell including the catalyst electrodes.

BACKGROUND ART

A fuel cell generally includes a membrane electrode assembly as a power generation module in which electrodes are located on both faces of an electrolyte membrane. The electrodes of the membrane electrode assembly are formed as catalyst electrodes with a catalyst supported therein to accelerate fuel cell reaction. The catalyst electrode is typically formed by applying and drying a catalyst ink in the form of a slurry in which catalyst-supported particles or conductive particles with a catalyst supported thereon and an ionomer are dispersed in an organic solvent or an inorganic solvent (e.g., PTL1).

In order to improve the power generation performance and the durability of the fuel cell, the catalyst electrodes are desired to equalize the power generation distribution on the electrode surface, suppress damage or degradation on the electrode surface and improve the permeability and the diffusivity of a reactive gas. For the improved performance of the catalyst electrodes, the catalyst ink is needed to have structural uniformity, such as uniform dispersion of the catalyst-supported particles, unlikelihood to cause cracking, such as cracks and small holes in the dried state and likelihood to make porous in the dried state.

CITATION LIST

Patent Literature

[PTL1] JP 2010-257929A
[PTL2] JP H09-075698A

SUMMARY OF INVENTION

Technical Problem

The object of the invention is to provide a catalyst ink for improving the performance of catalyst electrodes.

Solution to Problem

In order to solve at least part of the problems described above, the invention provides aspects and embodiments described below.

[Aspect 1]

There is provided a manufacturing method of a catalyst ink used for formation of a catalyst electrode, the manufacturing method comprising steps of:

(a) dispersing catalyst-supported particles as conductive particles with a catalyst supported thereon in a solvent to prepare a catalyst dispersion;

(b) mixing an ionomer with a volatile solvent to prepare a gel material; and (c) stirring and mixing the catalyst dispersion with the gel material to produce a catalyst ink.

This manufacturing method enables a catalyst ink having high dispersibility of catalyst-supported particles, adequate viscosity and high coating performance to be efficiently produced. This improves the coating performance of the catalyst ink, accelerates the structural uniformity of catalyst electrodes and improves the durability and the power generation performance of the catalyst electrodes.

When the catalyst ink produced by this manufacturing method is dried, it is contemplated that pore spaces surrounded by the ionomer are formed by volatilization of the volatile solvent surrounded by the ionomer in the gel material. The coating film of the catalyst ink is thus readily made porous and readily forms catalyst electrodes having the high gas permeability and diffusivity. The catalyst ink produced by the manufacturing method of this aspect can thus readily form catalyst electrodes having high power generation performance and high durability.

[Aspect 2]

There is provided the manufacturing method according to Aspect 1, wherein the step (a) comprises a step of adding a surface active agent to improve dispersibility of the catalyst-supported particles, and the surface active agent is an ionomer that is a similar type of an ionomer to the ionomer used in the step (b).

This manufacturing method enables the ionomer as one of the primary materials of the catalyst ink to serve as a dispersion accelerator for accelerating dispersion of the catalyst-supported particles, thus improving the dispersibility of the catalyst-supported particles in catalyst electrodes.

When a different material other than the ionomer is added as the dispersion accelerator, there is a possibility that impurities remain in resulting catalyst electrodes. The manufacturing method of this aspect, however, uses the ionomer which is intrinsically to be contained in catalyst electrodes as the dispersion accelerator. This reduces the possibility that impurities remain in the catalyst electrodes.

[Aspect 3]

There is provided the manufacturing method according to Aspect 2, wherein a ratio Wp of weight of the ionomer added to the catalyst dispersion in the step (a) to weight of the ionomer contained in the catalyst ink produced in the step (c) satisfies about 5%≤Wp≤about 25%.

This manufacturing method enhances the effect of the ionomer to accelerate the dispersibility of he catalyst-supported particles. This also adequately ensures the amount of the ionomer added as the material to be contained in the gel material, thus suppressing reduction of the coating strength of the catalyst ink.

[Aspect 4]

There is provided the manufacturing method according to any one of Aspects 1 to 3, wherein the step (b) comprises a step of thickening the gel material by heating.

This manufacturing method readily provides the gel material with desired viscoelasticity by heating treatment. The gel material having adequate viscoelasticity provides the catalyst ink with adequate coating strength. This accordingly enables a catalyst ink having higher coating performance to be readily produced.

[Aspect 5]

There is provided the manufacturing method according to any one of Aspects 1 to 4, wherein the step (b) comprises a step of thickening the gel material by applying a shear force.

This manufacturing method readily provides the gel material with desired viscoelasticity by application of a shear force. This accordingly enables a catalyst ink having higher coating performance to be readily produced.

[Aspect 6]

There is provided the manufacturing method according to any one of Aspects 1 to 5, wherein the volatile solvent is an alcohol solution, and the step (b) comprises a step of regulating concentration of an alcohol in the alcohol solution, so as to adjust viscoelasticity of the gel material.

This manufacturing method readily provides the gel material with desired viscoelasticity by regulating the concentration of the alcohol as one of the primary materials of the gel material. This accordingly enables a catalyst ink having improved coating performance to be readily produced.

[Aspect 7]

There is provided the manufacturing method according to any one of Aspects 1 to 6, wherein a storage modulus G1 of the gel material prepared in the step (b) satisfies: about 125 Pa≤G1≤about 425 Pa at a strain amount of 1% under application of vibration having a frequency of 1 Hz.

This manufacturing method adequately adjusts the storage modulus to enable the gel material to have adequate viscoelasticity. This accordingly provides a catalyst ink having higher coating performance.

[Aspect 8]

There is provided the manufacturing method according to any one of Aspects 1 to 7, wherein the step (c) comprises steps of supplying the catalyst dispersion and the gel material into a vessel; and applying a force toward a side face direction of the vessel to a mixed fluid of the catalyst dispersion and the gel material by utilizing a centrifugal force generated by a rotor rotating in the vessel, and stirring the mixed fluid in a state that the mixed fluid adheres in a film-like state on the side face, so as to adjust viscosity of the catalyst ink.

This manufacturing method efficiently improves the dispersibility of the catalyst-supported particles in the mixing process of the catalyst dispersion with the gel material and adequately adjusts the viscosity of the catalyst ink.

[Aspect 9]

There is provided the manufacturing method according to any one of Aspects 1 to 8, wherein the step (c) includes multiple stirring operations to apply different shear forces to a mixture of the catalyst dispersion and the gel material.

This manufacturing method improves the dispersibility of the catalyst-supported particles and the dispersibility of the ionomer mixed as the gel material, in the catalyst ink.

[Aspect 10]

There is provided the manufacturing method according to Aspect 9, wherein the multiple stirring operations include a first stirring operation to apply a low shear force and a second stirring operation performed subsequent to the first stirring operation to apply a high shear force, wherein a storage modulus G2 of the mixture after the first stirring operation satisfies: about 0 Pa≤G2≤about 10 Pa at a strain amount of 1% under application of vibration having a frequency of 1 Hz.

This manufacturing method more adequately adjusts the disperbility of the ionomer in the catalyst ink.

[Aspect 11]

There is provided the manufacturing method according to Aspect 10, wherein a storage modulus G1 of the gel material prepared in the step (b) satisfies: about 150 Pa≤G1≤about 300 Pa at a strain amount of 1% under application of vibration having a frequency of 1 Hz.

This manufacturing method more adequately disperses the gel material by the first and the second stirring operations.

[Aspect 12]

There is provided the manufacturing method according to Aspect 2, wherein the step (c) mixes the catalyst dispersion with the gel material, such that a ratio Wri of weight of the ionomer included in the gel material to weight of the ionomer included in the catalyst dispersion satisfies Wri≥about 9.

The catalyst ink manufactured by this manufacturing method suppresses the occurrence of cracking in catalyst electrodes.

[Aspect 13]

There is provided the manufacturing method according to any one of Aspects 1 to 12, wherein a storage modulus Gi of the catalyst ink produced in the step (c) satisfies: about 5 Pa≤G1≤about 30 Pa at a strain amount of 1% under application of vibration having a frequency of 1 Hz.

This manufacturing method produces a catalyst ink having high coating performance.

[Aspect 14]

There is provided a manufacturing method of a fuel cell, comprising: applying the catalyst ink produced by the manufacturing method according to any one of Aspects 1 to 13 by die-coat method to form a catalyst electrode.

This manufacturing method efficiently forms the high-performance catalyst electrodes during manufacture of the fuel cell. This manufacturing method also enables a plurality of catalyst electrodes to be sequentially formed by intermittently applying the catalyst ink on a belt-like electrolyte membrane, thus facilitating mass production of fuel cells.

[Aspect 15]

There is provided a fuel cell, comprising: a catalyst electrode formed by using the catalyst ink produced by the manufacturing method according to any one of Aspects 1 to 13.

This fuel cell includes the high-performance catalyst electrodes and accordingly has high power generation performance and high durability.

[Aspect 16]

There is provided a manufacturing method of a catalyst ink used for formation of a catalyst electrode, the manufacturing method comprising steps of:

(a) dispersing catalyst-supported particles as conductive particles with a catalyst supported thereon in a solvent to prepare a catalyst dispersion;

(b) heating a mixed fluid of an ionomer and a volatile solvent; and (c) mixing the catalyst dispersion with the mixed fluid to produce a catalyst ink.

In the catalyst ink produced by this manufacturing method, aggregates of molecules formed by adsorption of the ionomer to solvent molecules by heating are dispersedly located. The aggregates of the molecules form pores when the coating film is dried. This accordingly forms catalyst electrodes having high gas permeability and diffusivity.

The invention may be implemented by various aspects. For example, the invention may be implemented by the aspects of a manufacturing method of a catalyst ink for formation of a catalyst electrode, manufacturing methods of a membrane electrode assembly and a fuel cell including the manufacturing method of the catalyst ink, devices performing the respective processes of these manufacturing methods, control programs for controlling these devices and storage media in which such control programs are stored. The invention may also be implemented by the aspects of, for example, a catalyst ink, a membrane electrode assembly formed by using the catalyst ink, a fuel cell including the membrane electrode assembly, a fuel cell system including the fuel cell and a vehicle with the fuel cell system mounted thereon.

BRIEF DESCRIPTION OF DRAWINGS

FIG. 8 is a diagram illustrating a formation process of a first electrode;

FIG. 10 is diagrams showing the results of an experiment to verify the effect of dispersion of catalyst-supported particles by an ionomer added to a catalyst dispersion;

FIG. 11 is a diagram showing the results of an experiment to verify the relationship between the storage modulus of a gel material and the coating performance of a catalyst ink;

FIG. 22 is a diagram showing photographic images of the surfaces of catalyst electrodes produced by using gel materials having different storage moduli;

FIGS. 25A and 25B are diagrams illustrating the reason why the occurrence of cracking in the catalyst electrode is suppressed by increasing the ionomer ratio.

DESCRIPTION OF EMBODIMENTS

A. First Embodiment

Figure 1:
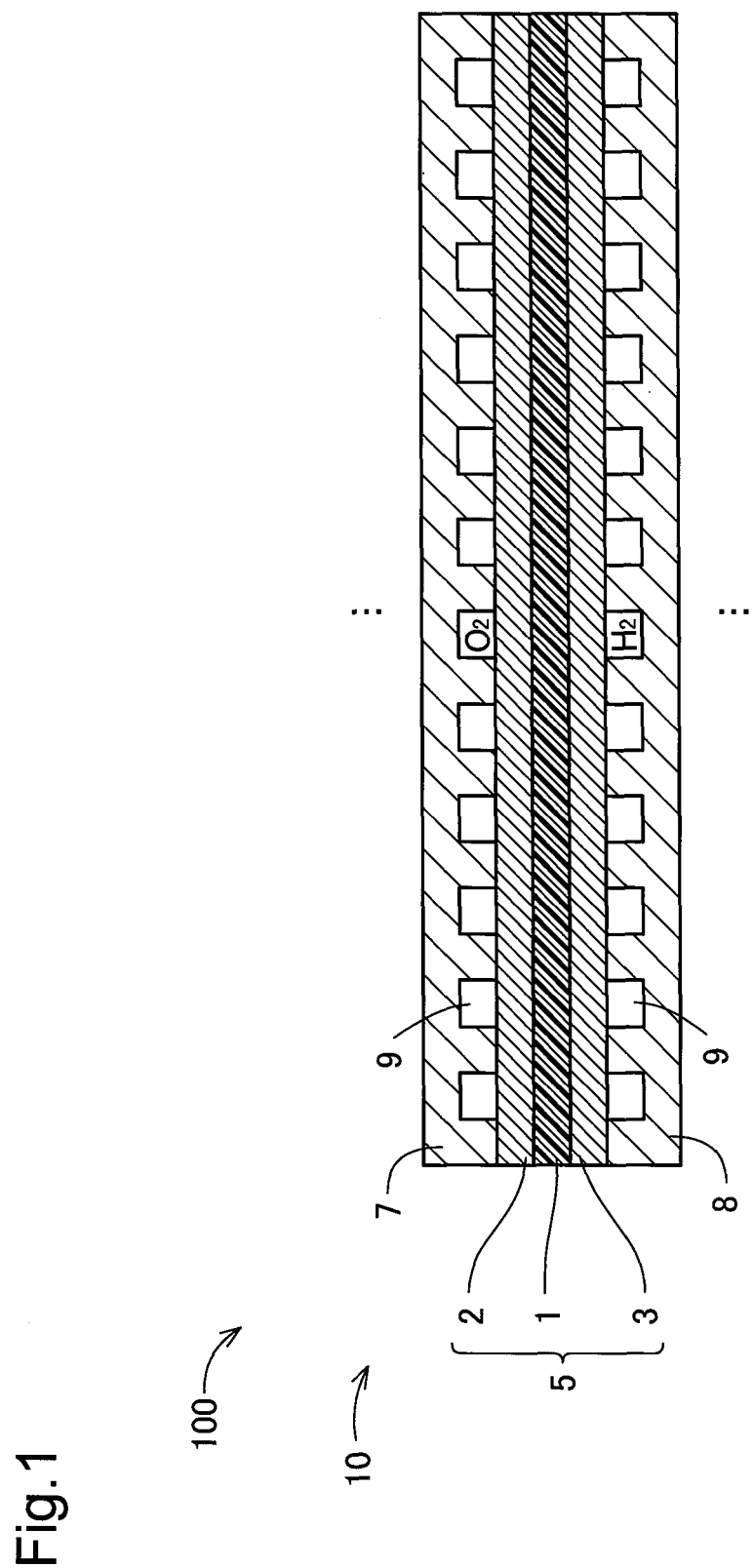
FIG. 1 is a schematic diagram illustrating an exemplary configuration of a fuel cell.

FIG. 1 is a schematic diagram illustrating an exemplary configuration of a fuel cell according to one embodiment of the invention. This fuel cell 100 is a polymer electrolyte fuel cell that receives supplies of hydrogen and oxygen as reactive gases and generates electricity. The fuel cell 100 has stack structure in which a plurality of unit cells 10 are stacked.

The unit cell 10 includes a membrane electrode assembly 5 and first and second separators 7 and 8 which are arranged to place the membrane electrode assembly 5 therebetween. Each unit cell 10 also has seal elements to prevent fluid leakage and manifolds to supply the reactive gases to the membrane electrode assembly 5, which are not specifically illustrated or described herein.

The membrane electrode assembly 5 is a power generation module having a first electrode 2 and a second electrode 3 placed on both faces of an electrolyte membrane 1 having good proton conductivity in the wet state. The electrolyte membrane 1 is made of a thin film of polymer having ion conductivity (hereinafter referred to as "ionomer") and may be made of, for example, a fluororesin-based ion exchange membrane. More specifically, a perfluorosulfonic acid polymer having —$SO_3H$ group on its side chain end, such as Nafion (registered trademark) may be employed for the electrolyte membrane 1.

The first and the second electrodes 2 and 3 are catalyst electrodes with a catalyst (e.g., platinum (Pt)) for accelerating fuel cell reaction supported therein and have gas permeability and gas diffusivity. The first electrode 2 and the second electrode 3 respectively receive supplies of oxygen and hydrogen and serve as a cathode and an anode during operation of the fuel cell 100.

The first and the second electrodes 2 and 3 are formed by applying and drying a catalyst ink prepared by dispersing an ionomer similar to or identical with the ionomer included in the electrolyte membrane 1 and catalyst-supported particles made of conductive particles with a catalyst supported thereon in a water-soluble solvent or an organic solvent. According to this embodiment, the catalyst ink used for formation of the first and the second electrodes 2 and 3 will be described later in detail with respect to description of a manufacturing process of the membrane electrode assembly 5.

Gas diffusion layers may be placed on respective outer sides of the first and the second electrodes 2 and 3 to spread the reactive gases over the respective electrode planes. The gas diffusion layers may be, for example, porous fibrous base materials having electrical conductivity, gas permeability and gas diffusivity, such as carbon fibers or graphite fibers, or metal plates processed to be porous, such as metal foams or expanded metals.

The first and the second separators 7 and 8 may be made of gas-impermeable plate-like members having electrical conductivity (for example, metal plates). The first separator 7 is located on the first electrode 2-side of the membrane electrode assembly 5, and the second separator 8 is located on the second electrode 3-side. Flow channels 9 for the reactive gases are formed over the entire power generation areas on the surfaces of the respective separators 7 and 8 facing the membrane electrode assembly 5. The flow channels 9 may be omitted as appropriate.

Figure 2:
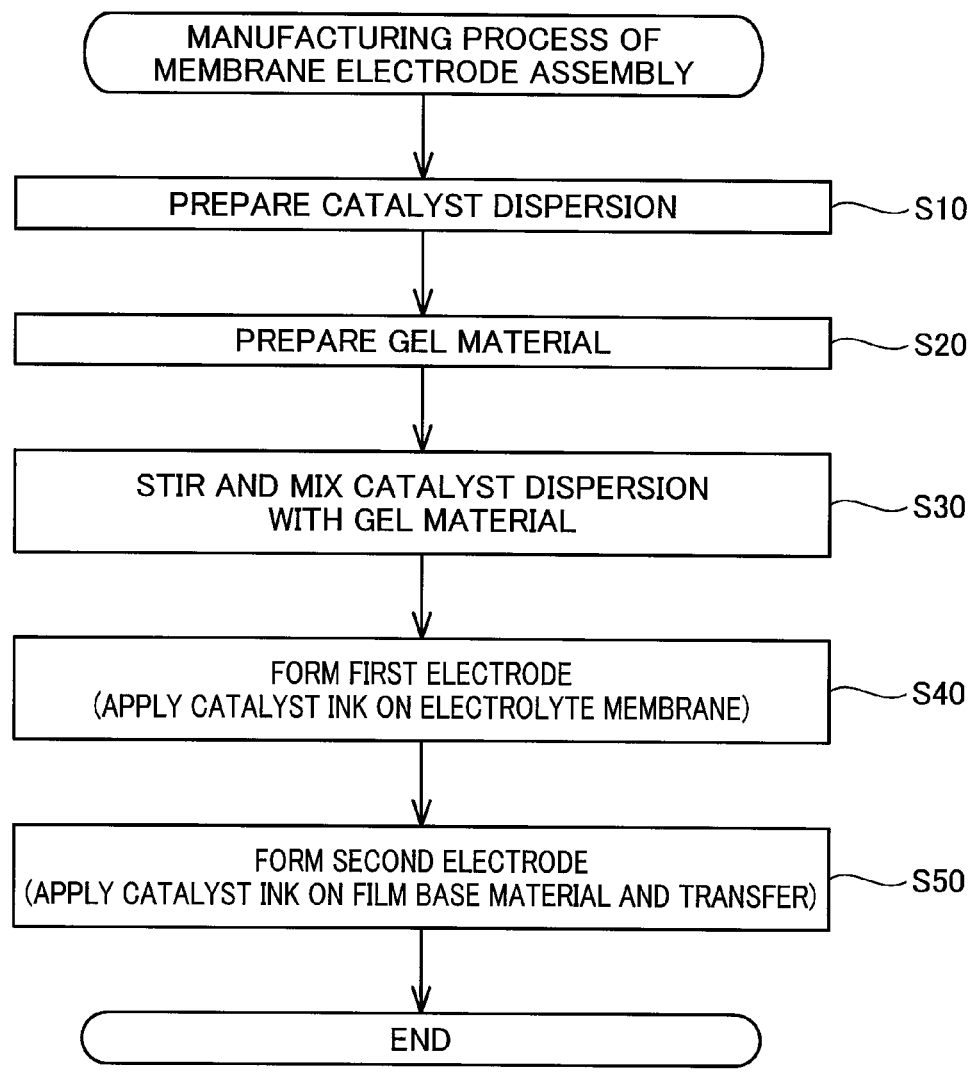
FIG. 2 is a diagram showing the procedure of a manufacturing process of a membrane electrode assembly.

FIG. 2 is a flowchart showing the procedure of a manufacturing process of the membrane electrode assembly 5. This manufacturing process produces a catalyst ink through the process of steps S10 to S30 and uses the catalyst ink to form the first and the second electrodes 2 and 3 on the outer surfaces of the electrolyte membrane 1 and thereby manufacture the membrane electrode assembly 5 through the process of steps S40 and S50.

Figure 3:
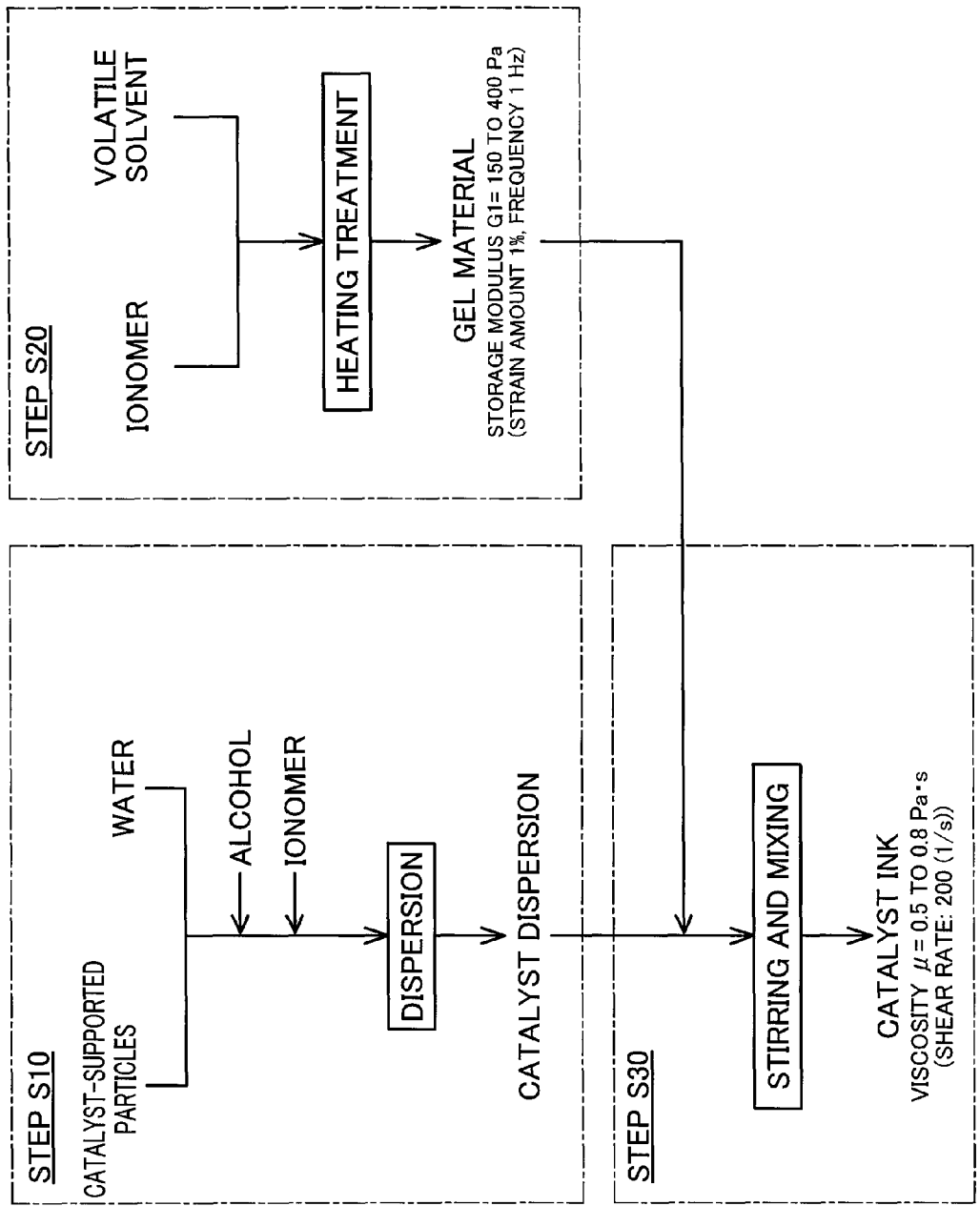
FIG. 3 is a diagram illustrating a manufacturing process of catalyst ink in detail.

FIG. 3 is a diagram illustrating the manufacturing process of the catalyst ink at steps S10 to S30 in detail. The catalyst ink according to this embodiment is produced by stirring and mixing a catalyst dispersion, in which catalyst-supported particles are dispersed, with a viscoelastic gel material prepared using an ionomer, so as to have a desired viscosity. The process is described specifically below.

<Process Detail at Step S10>

A catalyst dispersion is prepared by dispersing catalyst-supported particles in a solvent. More specifically, an alcohol is added to an aqueous dispersion of catalyst-supported particles (e.g., platinum-supported carbon) mixed with water. Pre-mixing the catalyst-supported particles with water to soak the catalyst-supported particles in water suppresses ignition during addition of the alcohol.

According to this embodiment, an ionomer solution including the same type of an ionomer as used at step S20 is added to the solvent liquid in which the above catalyst-supported particles are mixed with the alcohol. This ionomer serves as a surface active agent to accelerate dispersion of the catalyst-supported particles.

After addition of the ionomer solution, the mixed solution of the catalyst-supported particles, the alcohol and the ionomer is stirred with an ultrasonic disperser. In this process, the ionomer solution may be added to the aqueous dispersion of the catalyst-carried particles prior to addition of the alcohol.

<Preferable Process Conditions at Step S10>

Weight fraction of catalyst in the catalyst-supported particles: 40 to 60 wt %;

Amount of water added: weight of about one to five times the weight of the catalyst-supported particles to be dispersed;

Amount of alcohol added: weight of about three to five times the weight of the catalyst-supported particles to be dispersed; and Amount of ionomer added: determined according to the amount of the ionomer to be contained in the resulting catalyst ink, which will be described later in detail.

<Process Detail at Step S20>

A gel material is prepared by mixing an ionomer with a volatile solvent. More specifically, a mixed solution is prepared by mixing an ionomer solution with a volatile solvent and is thickened by thickening treatment, so that a gel material having a specified viscoelasticity is obtained. According to this embodiment, an alcohol solution is used as the volatile solvent, and heating treatment is employed as the thickening treatment. The heating treatment may be implemented using an evaporator or an autoclave.

<Preferable Process Conditions at Step S20>

EW (Equivalent Weight) value of ionomer: 500 to 900 g/mol;

Weight fraction of alcohol in mixed solution: 5 to 20 wt %;

Heating temperature: 60 to 90° C.; and

Heating time: 50 to 70 minutes.

The "EW value of ionomer" means an ion exchange equivalent and is a value indicating the dry weight of the ionomer per 1 mole of an ion exchange group. A catalyst electrode formed from a catalyst ink using an ionomer having the EW value of less than 500 g/mol is more likely to reduce the mobility of water content in the catalyst electrode and degrade the power generation performance. The ionomer having the EW value of less than 500 g/mol is easily dissolved in hot water (for example, water of 80° C. or higher temperature), so that the catalyst electrode formed from the catalyst ink using such ionomer is likely to reduce the resistance to the high temperature and humidity environment, such as inside of the fuel cell during operation. Using an ionomer having the EW value of greater than 900 g/mol, on the other hand, causes difficulty in thickening the gel material to have the viscoelasticity described below.

<Preferable Viscoelasticity of Gel Material>

The inventors of the present invention have found that the gel material prepared at this step preferably has the following viscoelasticity:

A storage modulus G1 of the gel material at the strain amount of 1% under application of vibration having the frequency of 1 Hz preferably satisfies:

$$125 \text{ Pa} \leq G1 \leq 425 \text{ Pa}$$

and more preferably satisfies:

$$150 \text{ Pa} \leq G1 \leq 400 \text{ Pa}.$$

A catalyst ink formed from a gel material having the above storage modulus G1 of less than 125 Pa or more specifically a gel material having the storage modulus G1 of less than 150 Pa is more likely to provide insufficient coating strength in the coating process of the catalyst ink and degrade a resulting catalyst electrode. A catalyst ink formed from a gel material having the above storage modulus G1 of greater than 425 Pa or more specifically a gel material having the storage modulus G1 of greater than 400 Pa, on the other hand, is more likely to reduce the dispersibility of the catalyst-supported particles which are dispersed at step S30. The storage modulus G1 of the gel material may be adjusted as described below.

Figure 4:
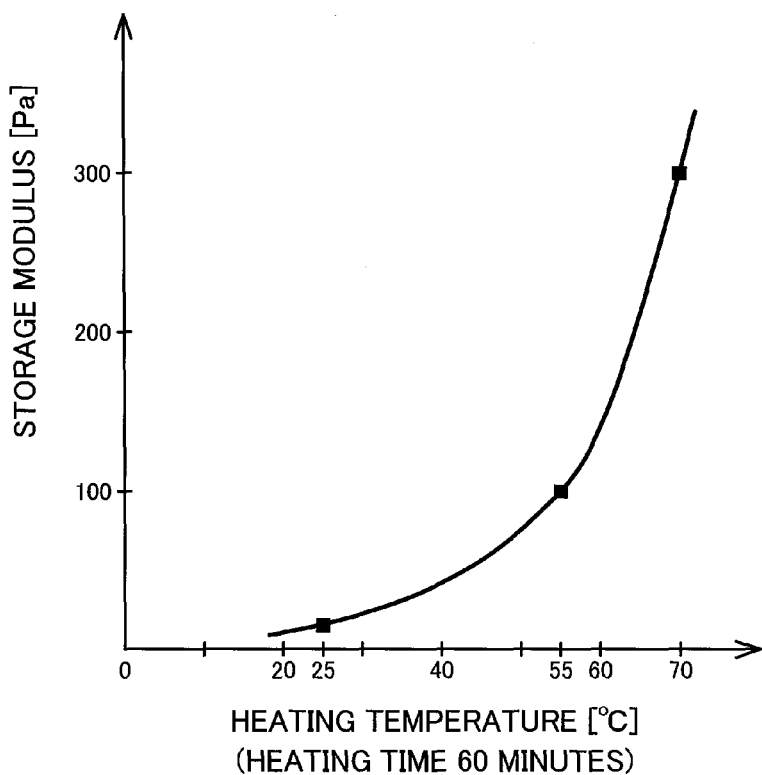
FIG. 4 is a diagram illustrating the relationship between the heating temperature for a gel material and the storage modulus of the gel material.

FIG. 4 is a graph illustrating an exemplary relationship between the heating temperature for a gel material and the storage modulus of the gel material obtained by an experiment performed by the inventors. This experiment performed heating treatment for a heating time of 60 minutes with respect to a mixed solution in which a predetermined amount of an ionomer is mixed with an alcohol and measured the viscoelasticity of a resulting gel material using a measuring device manufactured by Anton-Paar.

The viscoelasticity of the gel material prepared by using the ionomer and the volatile solvent varies with heating temperature. Specifying in advance the relationship between the storage modulus of the gel material and the heating temperature, e.g., experimentally, such as the graph shown in FIG. 4, accordingly enables the viscoelasticity of the gel material to be adjusted by regulating the heating temperature. The viscoelasticity of the gel material may otherwise be adjusted by the heating time.

<Process Detail at Step S30>

A catalyst ink having a desired viscosity is obtained by stirring and mixing the catalyst dispersion obtained at step S10 with the gel obtained at step S20. According to this embodiment, the catalyst dispersion and the gel material are mixed at a mass ratio of approximately 1:1, and the viscosity of the catalyst ink is adjusted by regulating the stirring power. According to this embodiment, the catalyst ink is adjusted to have the following viscosity.

<Viscosity μ of Catalyst Ink>

At a shear rate of 200 (1/sec), the viscosity μ preferably satisfies:

0.4 Pa·s≤μ≤0.9 Pa·s and more preferably satisfies:

0.5 Pa·s≤μ≤0.8 Pa·s.

The catalyst ink having the viscosity μ in this preferable range is suitable for a coating process by die-coating method. It is preferable to use a stirring device having the configuration described below, in order to provide the catalyst ink having such viscosity by stirring.

Figure 5:
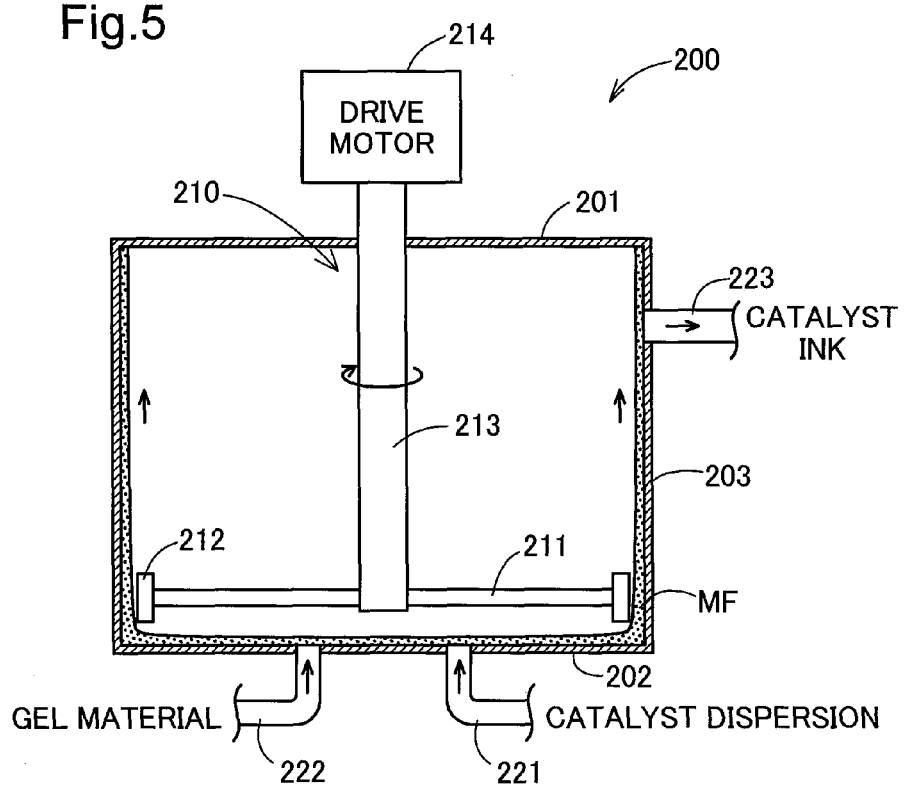
FIG. 5 is a schematic diagram illustrating the configuration of a stirring device.

FIG. 5 is a schematic diagram illustrating the configuration of the stirring device suitable for the process at step S30. This stirring device 200 includes a vessel 201 and an agitation assembly 210. The vessel 201 is a cylindrical hollow container. First and second supply pipes 221 and 222 are connected to a bottom face 202 of the vessel 201 to supply the objects of the stirring and mixing process into the vessel 201. A delivery pipe 223 is connected at an upper position on a side face 203 of the vessel 201 to deliver a stirred product after the stirring and mixing process.

The agitation assembly 210 includes a rotor 211, a rotating shaft 213 and a drive motor 214. The rotor 211 is a blade-like rotor which is linked with and suspended from the drive motor 214 via the rotating shaft 213 at the center inside of the vessel 201, such that the rotor 211 is rotatable at high speed along the bottom face 202 of the vessel 201. The rotor 211 has plate-like stirring bars 212 located on both ends along the side face 203 of the vessel 201. There are spaces that allow formation of a thin film, between the stirring bars 212 and the side face 203 of the vessel 201.

In the manufacturing process of this embodiment, the catalyst dispersion and the gel material are supplied through the first and the second supply pipes 221 and 222 into the vessel 201 of the stirring device 200. In the stirring device 200, a mixed fluid MF of the catalyst dispersion and the gel material as the stirring object is rotated and flowed by the high-speed rotation of the rotor 211. The mixed fluid MF is then pushed outward in the vessel 201 to adhere in a film-like state on the side face 203 of the vessel 201.

In this stirring device 200, the mixed fluid MF is rotated and flowed to be stirred with a pressure toward the side face 203 of the vessel 201 received by the centrifugal force generated by the high-speed rotation of the rotor 211. Pulverization and refinement of the catalyst-supported particles and the gel material in the mixed fluid MF are accelerated according to the distance of the spaces between the stirring bars 212 and the side face 203 of the vessel 201. The mixed fluid MF is rotated along the side face 203 of the vessel 201 while being flowed upward in the vessel 201, so as to be delivered through the delivery pipe 223 to the outside of the vessel 201.

In this stirring device 200, the stirring power may be controlled by regulating the rotation speed (peripheral speed) of the rotor 211 and the supply rates of the catalyst dispersion and the gel material through the first and the second supply pipes 221 and 222, so that the viscosity of the catalyst ink as the stirred product may be adjusted. For example, the viscosity of the catalyst ink is increased with an increase in peripheral speed. The viscosity of the catalyst ink is also increased with a decrease in supply rates of the mixing materials. The specific process conditions of the stirring device 200 are given below.

<Process Conditions of Stirring Device>

Peripheral speed: 5 to 25 m/min;

Supply rates of catalyst dispersion and gel material: 5 to 25 g/min

The catalyst ink having the desired viscosity is obtained by the process of steps S10 to S30 as described above. In general, the performance of the catalyst electrode depends on the amount of the ionomer contained in the catalyst ink. According to this embodiment, the amount of the ionomer included in the catalyst ink is adjusted by the following procedure.

<Amount of Ionomer Included in Catalyst Ink>

In the catalyst electrode, the ionomer provides the proton conductivity, and the catalyst-supported particles provide the electrical conductivity. The content of the ionomer affects the mobility of the water content in the catalyst electrode and the bondability between the catalyst electrode and the electrolyte membrane. In general, the catalyst ink is prepared, such that the ratio (I/C) of the mass (I) of the ionomer to be contained in the catalyst electrode to the mass (C) of the conductive particles as the carrier of the catalyst is adjusted to be a desired value preferable for improvement of the performance of the fuel cell. According to this embodiment, the value of I/C is adjusted to be approximately 1.0.

According to this embodiment, the ionomer is added to the catalyst dispersion at step S10, and the gel material is prepared by using the ionomer at step S20. The amount of the ionomer included in the catalyst ink obtained at step S30 is accordingly the sum of the amount of the ionomer included in the catalyst dispersion and the amount of the ionomer included in the gel material. In order to adjust I/C of the catalyst ink to the desired value, it is preferable to adjust the amounts of the ionomers respectively used at steps S10 and S20 according to the final amount of the ionomer to be included in the catalyst ink.

The inventors of the present invention have found experimentally that it is preferable to add the ionomer of not less than a predetermined amount to the amount of the catalyst-supported particles contained in the catalyst dispersion, in order to accelerate dispersion of the catalyst-supported particles by the ionomer at step S10. The inventors of the present invention have also found that increasing the amount of the ionomer added to the catalyst dispersion over a predetermined amount and decreasing the amount of the ionomer mixed in the gel material at step S30 fail to produce a catalyst ink having the sufficient coating strength.

Based on these, the inventors of the present invention have found the following with respect to the amount of the ionomer added at step S10. More specifically, the lower limit of the amount of the ionomer added at step S10 is preferably determined according to the amount of the catalyst-supported particles contained in the catalyst ink, and the upper limit is preferably determined to ensure the used amount of the ionomer at step S20. The following specifically describes the preferable amount of the ionomer added.

<Preferable Values of Amount of Ionomer Added at Step S10>

The ionomer added at step S10 preferably has the mass greater than 5% of the mass of the catalyst-supported particles contained in the catalyst dispersion, i.e., the catalyst-supported particles contained in the catalyst ink, and more preferably has the mass of not less than 10%. Addition of the ionomer having such mass to the catalyst dispersion sufficiently accelerates dispersion of the catalyst-supported particles.

The ionomer added at step S10 preferably has the mass less than 25% of the mass eventually contained in the catalyst ink, and more preferably has the mass of not greater than 20%. Limiting the amount of the ionomer added to the catalyst dispersion in this manner ensures the adequate amount of the ionomer used for the gel material at step S20. Accordingly, this enables the catalyst ink to have the sufficient coating strength and suppresses cracking, such as cracks and small holes, in the resulting catalyst electrode.

Three values Ia, Ib and Ic of the ionomer and a value Cc of the catalyst-supported particles are defined as follows:

Ia: the mass of the ionomer added at step S10;
Ib: the mass of the ionomer used for preparation of the gel material at step S20;
Ic: the mass of the ionomer included in the catalyst ink obtained at step S30; and
Cc: the mass of the catalyst-supported particles included in the catalyst ink obtained at step S30.

Herein Ic=Ia+Ib as described above.

The preferable range of the above value Ia is specified as follows:

$$0.05 \times Cc < Ia < 0.25 \times Ic \quad (1)$$

The range is more preferably:

$$0.1 \times Cc \leq Ia \leq 0.2 \times Ic \quad (1a)$$

When the catalyst ink is prepared to have I/C=α (where α is any real number greater than 0), since α=Ic/Cc, the above preferable range of Ia is expressed as:

$$0.05 \times Ic/\alpha < Ia < 0.26 \times Ic \quad (2)$$

The range is more preferably expressed as:

$$0.1 \times Ic/\alpha \leq Ia \leq 0.2 \times Ic \quad (2a)$$

Accordingly, when the catalyst ink is prepared to have I/C=1.0 like this embodiment, the preferable range of Ia is expressed as:

$$0.05 \times Ic < Ia < 0.25 \times Ic \quad (3)$$

The range is more preferably expressed as:

$$0.1 \times Ic \leq Ia \leq 0.2 \times Ic \quad (3a)$$

The ratio Wp of the weight of the ionomer added to the catalyst dispersion to the weight of the ionomer contained in the catalyst ink is shown as Wp=Ia/Ic×100.

Here the inequalities (3) and (3a) above are rewritten as the following inequalities (3') and (3a'):

$$5\% \leq Wp \leq 25\% \quad (3')$$

$$10\% \leq Wp \leq 20\% \quad (3a')$$

Figure 6A:
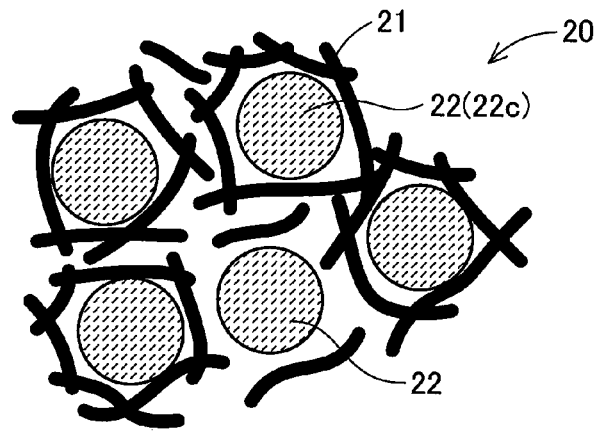
FIG. 6A to 6C are diagrams illustrating the properties of a catalyst ink obtained by the manufacturing process of the embodiment.
Figure 6B:
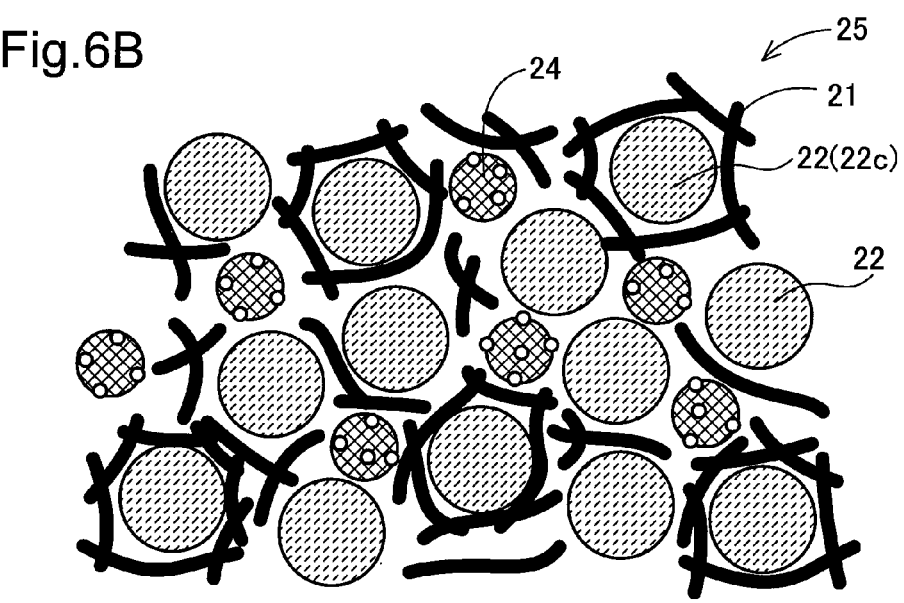
Figure 6C:
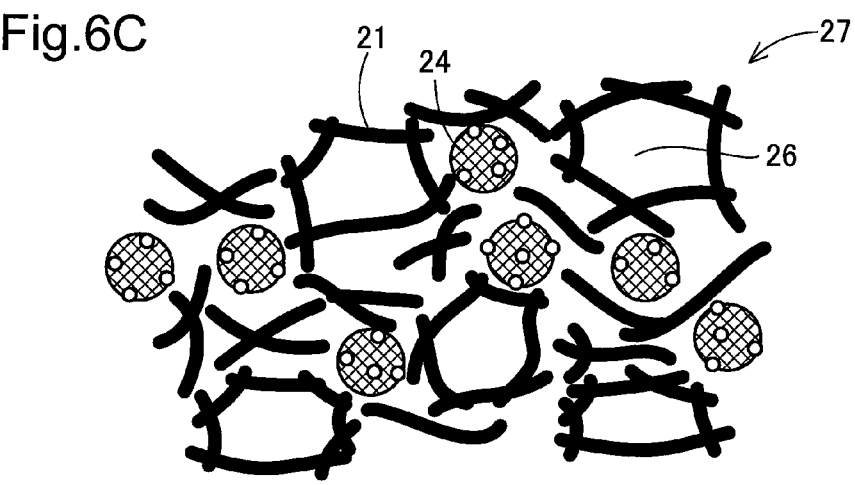

FIG. 6A to 6C is diagrams illustrating the properties of the catalyst ink obtained by the manufacturing process of this embodiment. The illustrations of FIG. 6A to 6C do not have differentiation between the types of solvent molecules, such as water and alcohol.

FIG. 6A is a schematic diagram illustrating the structure of a gel material obtained at step S20. As described above, a gel material 20 is formed by mixing solvent molecules 22 with an ionomer 21 and thickening the mixture.

The viscoelasticity of the gel material 20 may be attributed to the that the solvent molecules 22 are physically cross-linked with the ionomer 21 by their intermolecular force and that the solvent molecules 22 are surrounded by the ionomer 21 adsorbed on the periphery and are wrapped by the ionomer 21. In the description hereinafter, the solvent molecules 22 wrapped by the ionomer 21, i.e., trapped by the ionomer 21 are specifically called "trapped solvent molecules 22c".

FIG. 6B is a schematic diagram illustrating the structure of a catalyst ink obtained at step S30. A catalyst ink 25 is prepared by stirring and mixing the solvent molecules 22, which include the trapped solvent molecules 22c, included in the gel material 20 with the ionomer 21, the solvent molecules 22 and the catalyst-supported particles 24 included in the catalyst dispersion prepared at step S10 to be dispersed. The catalyst ink 25 of this embodiment has the adequate amount of the trapped solvent molecules 22c dispersed in adequate degree, so as to have the desired viscosity.

FIG. 6C is a schematic diagram illustrating the structure of a catalyst electrode formed by drying the catalyst ink obtained by the manufacturing process of this embodiment. In a catalyst electrode 27, the ionomer 21 and the catalyst-supported particles 24 remain after volatilization and removal of the solvent molecules 22 included in the catalyst ink 25. In the course of drying the catalyst ink 25, it is assumed that the trapped solvent molecules 22c wrapped by the ionomer 21 are volatilized after the solvent molecules 22 without adsorption of the ionomer 21 are volatilized.

Voids 26 surrounded by the ionomer 21, where the trapped solvent molecules 22c were present, remain in the catalyst electrode 27 after volatilization of the trapped solvent molecules 22c. These remaining voids 26 form pores serving as a passage of the reactive gas in the catalyst electrode 27. In other words, the catalyst ink 25 of the embodiment forms the porous structure after being dried, so as to provide a catalyst ink having the improved permeability and the diffusivity of the reactive gas.

Figure 7A:
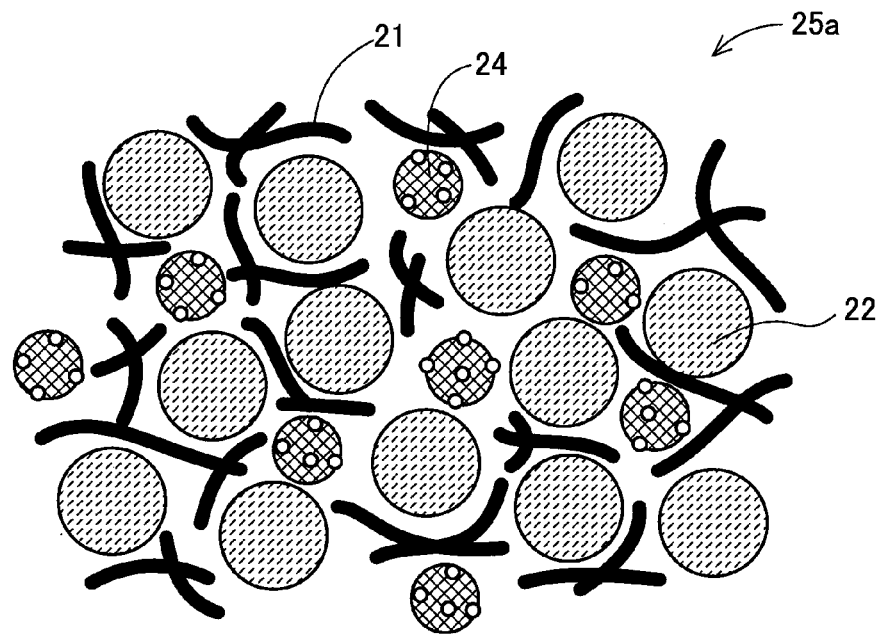
FIGS. 7A and 7B are diagrams illustrating a catalyst ink as a reference example.
Figure 7B:
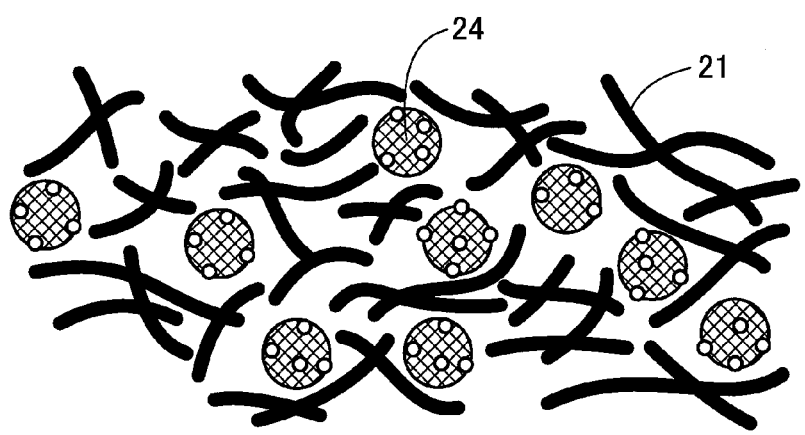

FIGS. 7A and 7B are diagrams illustrating a catalyst ink of a reference example. FIG. 7A is a schematic diagram illustrating the structure of a catalyst ink 25a of the reference example. FIG. 7B is a schematic diagram illustrating the structure of a catalyst electrode 27a formed by drying the catalyst ink 25a of the reference example. The catalyst ink 25a of this reference example is produced by preparing a catalyst dispersion in which catalyst-supported particles are dispersed in a solvent and subsequently mixing an ionomer solution with the catalyst dispersion.

The catalyst ink 25a of the reference example is in the state that an ionomer 21, solvent molecules 22 and catalyst-supported particles 24 are dispersed (FIG. 7A). The viscosity of the catalyst ink 25a of this reference example may be adjusted by heating the catalyst ink 25a while suppressing aggregation of the catalyst-supported particles 24 using, for example, an ultrasonic disperser. The catalyst ink 25a of the reference example is thickened by this method through adsorption of the ionomer 21 to the catalyst-supported particles 24 and decrease of the solvent molecules 24.

In other words, thickening the catalyst ink 25a of the reference example does not provide the state that the adequate amount of the trapped solvent molecules 22c are dispersed in adequate degree, like the catalyst ink 25 of the embodiment (FIG. 6B). The catalyst electrode 27a formed by drying the catalyst ink 25a of the reference example is accordingly tightened, compared with the catalyst electrode 27 formed from the catalyst ink 25 of the embodiment and thereby has the lower permeability and diffusivity of the reactive gas.

There are known techniques to make the catalyst electrode porous; for example, a method of forming the catalyst electrode by the spraying method; and a method of adding a pore-forming agent, such as naphthalene, to the catalyst ink. In the case of formation of the catalyst electrode by the spraying method, however, spraying and coating the catalyst ink is repeated a plurality of times. This may extend the process time. In the case of addition of a pore-forming agent to the catalyst ink, some of the pore-forming agent may remain in the catalyst electrode and cause contamination of the catalyst electrode with impurities.

The catalyst ink of the embodiment is, however, suitable for the coating technique of continuous application of the catalyst ink, such as the die-coating method described later. Employing the die-coating method for formation of the catalyst electrode ensures the porosity of the catalyst electrode. This method does not need addition of any pore-forming agent, thereby reducing contamination of the catalyst electrode with impurities and suppressing degradation and the lower durability of the catalyst electrode.

The manufacturing process of the catalyst ink of this embodiment ensures the dispersibility of the catalyst-supported particles in the preparation process of the catalyst dispersion and adjusts the viscosity of the catalyst ink by regulating the viscoelasticity of the gel material and the stirring power at step S30. In other words, the catalyst ink having the high dispersibility of the catalyst-supported particles and the desired viscosity is produced by the simpler process. Using the catalyst ink produced by this process improves the performance of the catalyst electrode, for example, the permeability and the diffusivity of the reactive gas in the catalyst electrode.

FIG. 8 is a diagram illustrating a formation process of the first electrode 2 at step S40 (FIG. 2). This process directly applies the catalyst ink on the electrolyte membrane by the die-coating method, so as to form the first electrode 2. FIG. 8 illustrates an exemplary coating device 300 of catalyst ink suitable for this process. This coating device 300 includes a conveyor 305, a membrane supplying unit 310, an ink coating unit 320 and a drying unit 330.

In the membrane supplying unit 310, an electrolyte membrane roll 301, in which a belt-like electrolyte membrane 1a is wound in a roll, is set, and the electrolyte membrane 1a is fed from the electrolyte membrane roll 301 to the conveyor 305 by a drive roller 311. The conveyor 305 is equipped with a plurality of conveying rollers 306 to convey the electrolyte membrane 1a in its longitudinal direction at a predetermined speed.

The ink coating unit 320 and the drying unit 330 are provided in the middle of the conveyor 305. The ink coating unit 320 has a die coater 321 as a coating tool and intermittently, with a period corresponding to the conveying speed, performs the coating process of applying the catalyst ink 25 produced by the process of steps S10 to S30 onto the outer surface of the electrolyte membrane 1a being conveyed. A plurality of coating films of the catalyst ink 25 are thus sequentially formed on the electrolyte membrane 1a. The catalyst ink 25 of this embodiment is adjusted to have the viscosity suitable for the coating process with the die coater 321, as described above.

The drying unit 330 heats and dries the coating films of the catalyst ink 25 with a heating unit, such as a heater, so as to form the first electrodes 2. The coating device 300 can thus sequentially form the plurality of first electrodes 2 on the belt-like electrolyte membrane 1a. After this process, the electrolyte membrane 1a is cut to separate the plurality of first electrodes 2.

Figure 9A:
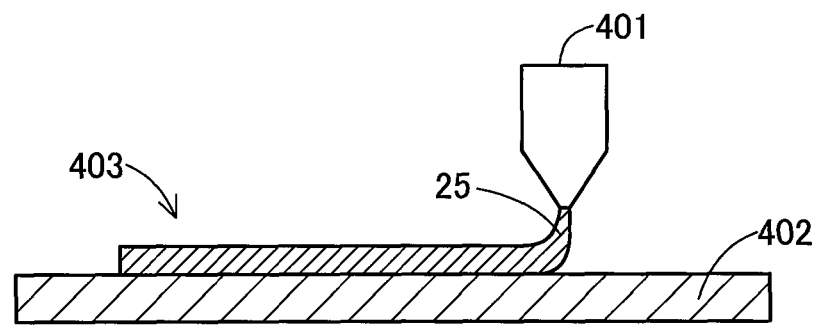
FIGS. 9A and 9B are diagrams illustrating a formation process of a second electrode.
Figure 9B:
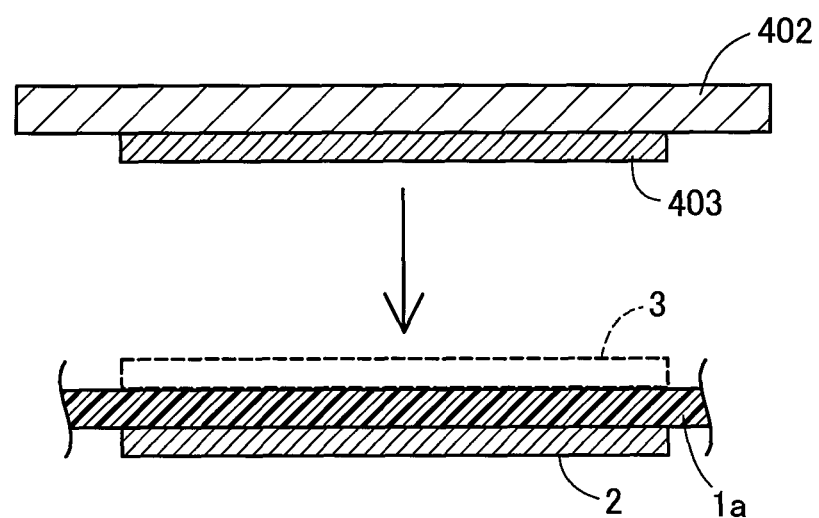

FIGS. 9A and 9B are diagrams illustrating a formation process of the second electrode 3 at step S50 (FIG. 2). The second electrode 3 may be formed on the belt-like electrolyte membrane 1a prior to cutting or may be formed on the electrolyte membrane 1 after cutting. The second electrode 3 may be formed on the electrolyte membrane 1a prior to formation of the first electrode 2. FIGS. 9A and 9B illustrate an exemplary process of forming the second electrode 3 on the belt-like electrolyte membrane 1a prior to cutting after formation of the first electrode 2.

This process first applies a strip of the catalyst ink 25 with, for example, a die coater 401 on the outer surface of a film base material 402 made of a resin material, such as polytetrafluoroethylene (PTFE) to form a coating film 403 (FIG. 9A). The coating film 403 is transferred to the opposite face of the electrolyte membrane 1a, which is opposite to the face with the first electrode 2, so as to form the second electrode 3 (FIG. 9B). This completes the membrane electrode assembly 5.

The transfer process may sequentially transfer the coating films 403 on the conveyed electrolyte membrane 1a in the downstream of the coating device 200 described above with reference to FIG. 8. This enables a plurality of the membrane electrode assemblies 5 to be completed sequentially.

The second electrode 3 formed by transfer from the film base material 402 is more likely to have the inner pores compressed by the pressure during transfer of the coating film 403, compared with the first electrode 2 formed by directly applying the catalyst ink 25 on the electrolyte membrane 1a. In order to suppress reduction of the distribution of the reactive gas in the fuel cell 100, it is preferable to supply hydrogen having the high mobility to the second electrode 3 and make the second electrode 3 serve as the anode. In order to suppress reduction of the drainage of water in the fuel cell 100, on the other hand, it is preferable to supply oxygen to the first electrode 2 with no compression of pores and make the first electrode 2 serve as the cathode.

It is also preferable that the first electrode 2 and the second electrode 3 have different amounts of the catalyst supported. More specifically, the coating amounts of the catalyst ink may be differed, such that the first electrode 2 serving as the cathode has the greater amount of the catalyst supported per unit area than the second electrode 3 serving as the anode. For example, the amount of the catalyst (platinum) supported per unit area may be 0.5 mg for the first electrode 2, and the amount of the catalyst (platinum) supported per unit area may be 0.1 mg for the second electrode 3. This reduces the used amount of the catalyst, while suppressing degradation of the power generation performance of the fuel cell 100.

The manufacturing process of this embodiment uses the catalyst ink having the viscosity suitable for formation of the catalyst electrodes by the die-coating method and the improved dispersibility of the catalyst-supported particles to sequentially form the catalyst electrodes having the high permeability and diffusivity of the reactive gas. This enables the fuel cell to be efficiently manufactured, while improving the performance of the fuel cell.

FIG. 10 is diagrams showing the results of an experiment performed by the inventors of the present invention to verify the effect of dispersion of the catalyst-supported particles by the ionomer added to the catalyst dispersion at step S10. FIG. 10 shows upper and lower graphs with the ionomer use ratio (wt %) as abscissa and the catalyst particle size (μm) as ordinate.

The "ionomer use ratio" as abscissa of the graphs means the ratio of the weight of the ionomer added to the catalyst dispersion to the weight of the conductive particles as the carrier of the catalyst included in the catalyst dispersion. When this catalyst dispersion is used for production of a catalyst ink having I/C=1.0, the ionomer use ratio is equal to the ratio Wp of the weight of the ionomer included in the catalyst dispersion to the weight of the ionomer included in the catalyst ink.

The "catalyst particle size" as ordinate of the graphs means the measurement value of the particle size of the catalyst-supported particles measured by laser diffractometry. The upper graph shows the particle size at d50, and the lower graph shows the particle size at d95. The "particle size at d50" herein means a specified particle size where the integrated value of the weight of particles having the particle size of not greater than the specified particle size occupies 50% of the total weight of the particles. Similarly the "particle size at d95" herein means a specified particle size where the integrated value of the weight of particles having the particle size of not greater than the specified particle size occupies 95% of the total weight of the particles.

The inventors of the present invention prepared a catalyst dispersion by the following procedure:

(1) Platinum-supported carbon having the platinum weight fraction of 50 wt % was soaked as the catalyst-supported particles in ion exchanged water having the weight of four times the weight of the platinum-supported carbon;

(2) Additionally, n-propyl alcohol having the weight of four times the weight of the platinum-supported carbon was added to the ion exchanged water;

(3) An ionomer solution containing an ionomer having the EW value of 600 to 850 at the concentration of 20 wt % was added as a surface active agent; and (4) A catalyst dispersion was prepared by performing the dispersion operation for 30 minutes with an ultrasonic disperser after stirring the above mixed solution for about 10 minutes.

As shown in the graphs of FIG. 10, in the range of the ionomer use ratio of 5% to 10%, with an increase in ionomer use ratio, the catalyst particle diameter was decreased, and the dispersibility of the catalyst-supported carbon was significantly improved. At the ionomer use ratio of or over 10%, the catalyst particle diameter was made substantially constant, and the dispersibility of the catalyst-supported carbon was maximized. This indicates that the ionomer use ratio is preferably greater than 5% and is more preferably not less than 10%, in order to improve the dispersibility of the catalyst-supported carbon.

In this experiment, a catalyst dispersion having the ionomer use ratio of greater than 20% was additionally prepared, and a catalyst electrode was formed by using the catalyst dispersion by the following procedure.

(5) A gel material was prepared by adding n-propyl alcohol to the above ionomer solution to the concentration of 8.5 wt % and subsequently refluxing and heating the mixture at about 70° C. for 60 minutes with an evaporator. The storage module G1 of this gel material was measured as the strain dependency at the strain amount of 1% by a measuring device manufactured by Anton-Paar under application of vibration having the frequency of 1 Hz. The measured storage modulus G was 150 to 400 Pa;

(6) The catalyst dispersion and the gel material described above were mixed to have I/C=1.0. More specifically, by using Filmix (model 56-50) manufactured by PRIMIX Corporation as a device that enables the similar stirring operation to that described above with reference to FIG. 5, the mixture was stirred for about 10 minutes at the peripheral speed of 10 m/min and the material supply rates of 30 g/min. The viscosity μ of the resulting catalyst ink was 0.5 to 0.8 Pa·s at the shear rate of 200 (1/sec); and (7) A catalyst electrode was formed by directly applying the catalyst ink on the electrolyte membrane to have the amount of the catalyst supported per unit area equal to 0.5 mg. A catalyst electrode was also formed by applying the catalyst ink on the film base material of PTFE to have the amount of the catalyst supported per unit area equal to 0.1 mg and subsequently transferring the coating film of the catalyst ink to the electrolyte membrane.

As a result, cracking occurred in any of the catalyst electrodes formed. Especially the catalyst electrode formed from the catalyst ink using the catalyst dispersion having the ionomer use ratio of not less than 25% had a significant degree of deterioration of the catalyst electrode by cracking. This may be attributed to that increasing the amount of the ionomer used for preparation of the catalyst dispersion decreases the amount of the ionomer used for the gel material and thereby fails to provide the adequate coating strength of the catalyst ink.

In order to ensure the coating performance of the catalyst ink, the ionomer use ratio is preferably less than 25% and is more preferably not greater than 20%. In other words, this means that the mass of the ionomer used for preparation of the gel material at step S20 is preferably not less than 75% of the mass of the ionomer contained in the catalyst ink and is more preferably greater than 80%.

FIG. 11 is a diagram showing the results of an experiment performed by the inventors of the present invention to verify the relationship between the storage modulus G1 of the gel material and the coating performance of the catalyst ink. FIG. 11 shows an array of photographic images of catalyst electrodes formed by using gel materials having different storage moduli G1. More specifically, the photographic images of catalyst electrodes formed by using gel materials having the storage modulus G1=100 Pa, 150 pa, 200 Pa, 400 Pa and 450 Pa are arranged sequentially from the top to the bottom. The storage modulus G1 is the measured value as the strain dependency at the strain amount of 1% by a measuring device manufactured by Anton-Paar under application of vibration having the frequency of 1 Hz.

At the upper left corner of each image in FIG. 11, the symbol "cross mark" is shown when any damage or deterioration such as cracking is observed in the catalyst electrode, and the symbol "circle" is shown when no such damage or deterioration is observed in the catalyst electrode. The respective images of FIG. 11 are on the same scale, and the line segment corresponding to the length of 500 μm is shown at the lower right corner of the top-most image to show the scaling.

The inventors of the present invention produced the catalyst electrode by the following procedure:

(1) A catalyst dispersion was prepared with the ionomer use ratio of 15% under the same conditions as those of the experiment of FIG. 10;

(2) An ionomer solution (EW value of 600 to 850) adjusted to the concentration of 8.5 wt % by addition of n-propyl alcohol was refluxed and heated by using an evaporator, so that five different gel materials having the above storage moduli G1 were prepared;

(3) The catalyst dispersion and each of the gel materials described above were mixed to have I/C=1.0. More specifically, by using Filmix (model 56-50) manufactured by PRIMIX Corporation as a device that enables the similar stirring operation to that described above with reference to FIG. 5, catalyst inks were produced by stirring the respective mixtures for about 10 minutes at the peripheral speed of 10 m/min and the material supply rates of 30 g/min; and (4) The catalyst ink was applied, such that the weight of platinum per unit area of the catalyst electrode was 0.5 mg (0.5 mg/cm$^2$).

The respective catalyst inks had the viscosity μ of 0.5 to 0.8 Pa·s at the shear rate of 200 (1/sec). The catalyst ink had the similar viscosity even when the settings of Filmix were the peripheral speed of 20 m/min and the material supply rates of 20 g/min and when the settings of Filmix were the peripheral speed of 30 m/min and the material supply rates of 10 g/min.

As shown in the photographic images of FIG. 11, the catalyst electrode had cracking at the storage modulus G1 of the gel material equal to 100 Pa. The catalyst electrode had a number of pinholes at the storage modulus G1 of the gel material equal to 450 Pa. This is attributed to that the excessively high storage modulus G1 of the gel material interferes with sufficiently mixing the catalyst dispersion with the gel material and thereby reduces the uniform dispersibility of the catalyst ink. When the storage modulus G1 of the gel material was in the range of 150 Pa to 400 Pa, on the other hand, the good catalyst electrode having the homogeneous structure was formed without causing deterioration, such as cracking or pinholes.

These results show that as the upper limit and the lower limit specifying the preferable range of the storage modulus G1 of the gel material at the strain amount of 1% under application of vibration having the frequency of 1 Hz, the lower limit is not less than 100 Pa and not greater than 150 Pa and the upper limit is not less than 400 Pa and not greater than 450 Pa. In other words, the storage modulus G1 of the gel material preferably satisfies:

$$125 \text{ Pa} \leq G1 \leq 425 \text{ Pa}$$

and more preferably satisfies:

$$150 \text{ Pa} \leq G1 \leq 400 \text{ Pa}.$$

Figure 12:
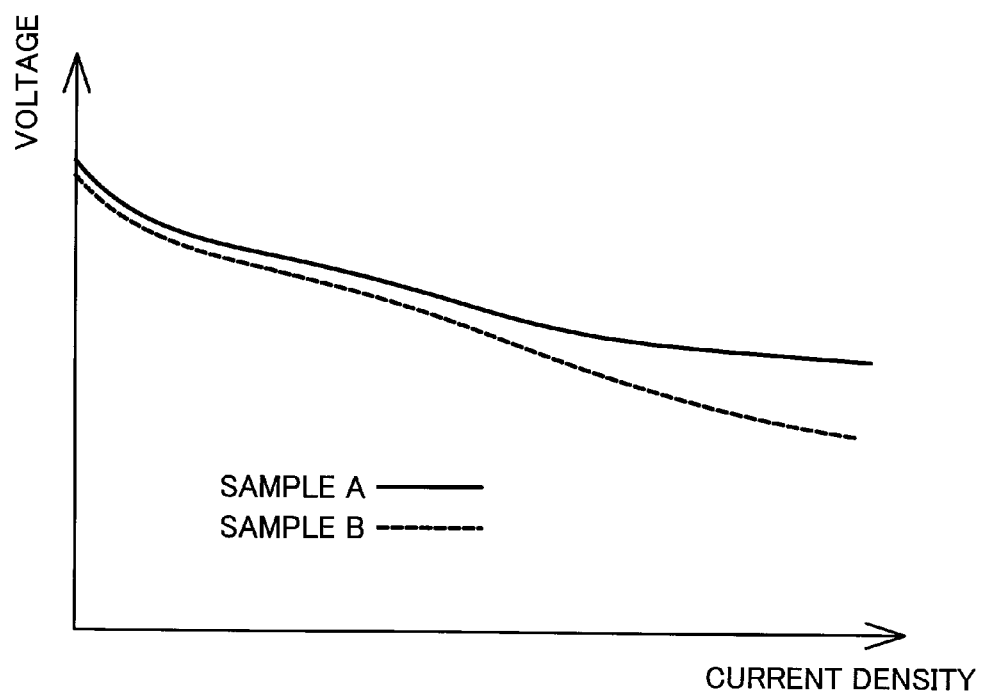
FIG. 12 is a diagram illustrating the results of an experiment to verify the power generation performance of a membrane electrode assembly obtained by the manufacturing process of this embodiment.

FIG. 12 is a diagram illustrating the results of an experiment to verify the power generation performance of a membrane electrode assembly obtained by the manufacturing process of this embodiment. FIG. 12 is a graph showing the power generation properties of two samples A and B of membrane electrode assemblies produced by the inventors. The inventors of the present invention produced the sample A of the membrane electrode assembly as an example of the embodiment and the sample B of the membrane electrode assembly as a reference example.

<Production of Sample A>

(1) A catalyst dispersion A was prepared with the ionomer use ratio of 15% under the same conditions as those of the experiment of FIG. 10;

(2) A gel material A was prepared by refluxing and heating an ionomer solution (EW value of 600 to 850) adjusted to the concentration of 8.5 wt % by addition of n-propyl alcohol, at the temperature of about 70° C. for about 60 minutes by using an evaporator. The storage module G1 of this gel material A was measured as the strain dependency at the strain amount of 1% by a measuring device manufactured by Anton-Paar under application of vibration having the frequency of 1 Hz. The measured storage modulus G was in the range of 150 to 400 Pa;

(3) A catalyst ink A was obtained by stirring the above catalyst dispersion A and gel material A to have I/C=1.0 by using Filmix (model 56-50) manufactured by PRIMIX Corporation (peripheral speed: 10 m/min, material supply rates: 30 g/min, process time: about 10 minutes). The viscosity μ of this catalyst ink A was 0.5 to 0.8 Pa·s at the shear rate of 200 (1/sec); and (4) Catalyst electrodes were formed from the above catalyst ink A on both faces of an electrolyte membrane, so that the sample A of the membrane electrode assembly was obtained. A cathode was formed by directly applying the catalyst ink A on the electrolyte membrane with a die coater. An anode was formed by forming a coating film of the catalyst ink A on a film base material of PTFE with a die coater and subsequently transferring the coating film onto the electrolyte membrane. The amounts of platinum supported per unit area on the cathode and the anode were as follows:

Amount of platinum supported on cathode: 0.25 mg/cm$^2$; and

Amount of platinum supported on anode: 0.1 mg/cm$^2$.

<Production of Sample B>

(1) A catalyst dispersion B was prepared by soaking platinum-supported carbon having the platinum weight fraction of 50 wt % in ion exchanged water of the weight four times the weight of the platinum-supported carbon and subsequently adding n-propyl alcohol of the weight four times the weight of the platinum-supported carbon;

(2) A catalyst ink B was obtained by adding an ionomer solution having the EW value of 600 to 850 to the above catalyst dispersion B to have I/C=1.0 and subsequently performing the dispersion operation using an ultrasonic disperser. This catalyst ink B was subjected to heating treatment to have a viscosity similar to the viscosity of the catalyst ink A used for the sample A; and (3) The sample B of the membrane electrode assembly was obtained under the same conditions as those of the sample A of the membrane electrode assembly, except that the catalyst ink B was used instead of the catalyst ink A.

The inventors of the present invention supplies non-humidified reactive gases to both the electrodes in the samples A and B of the membrane electrode assemblies to generate electricity at the operation temperature of about 75° C. As a result, when the two samples A and B were controlled to output an identical current density, the sample A always output the higher voltage than the sample B. The difference in output voltage between the sample A and the sample B increased with an increase in current density.

As described above, the catalyst electrode formed from the catalyst ink obtained by stirring and mixing the catalyst dispersion and the gel material to adjust the viscosity had the improved power generation performance, compared with the catalyst electrode formed from the catalyst ink obtained by mixing the ionomer solution with the catalyst dispersion and subsequently adjusting the viscosity. Such difference in power generation performance may be attributed to the difference in diffusion performance of the reactive gas in the catalyst electrode as described above with reference to FIGS. 6 and 7.

B. Second Embodiment

Figure 13:
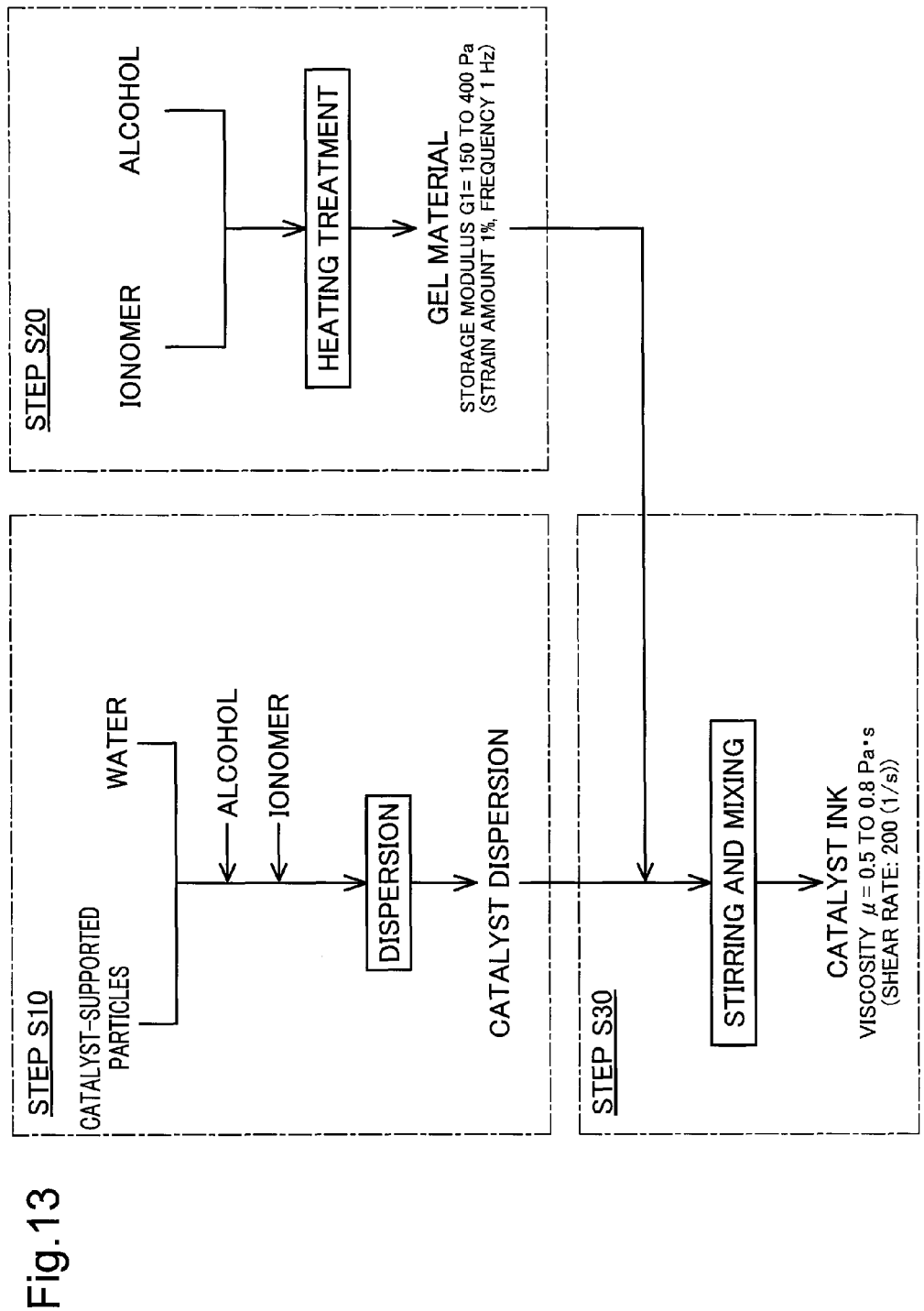
FIG. 13 is a diagram illustrating a manufacturing process of a catalyst ink according to a second embodiment.

FIG. 13 is a diagram illustrating a manufacturing process of a catalyst ink according to a second embodiment of the invention. FIG. 13 is similar to FIG. 3, except that the heating treatment is replaced by a process of applying a shear force at step S20. The manufacturing process of the catalyst ink according to the second embodiment is similar to the manufacturing process described in the above first embodiment, except the description below.

The inventors of the present invention have found that a mixed solution of an ionomer and a volatile solvent is thickened to have the higher viscosity under application of the higher shear force. Accordingly, the process of applying a shear force to the mixed solution may be employed, in place of the heating treatment described in the first embodiment, as the thickening treatment in the preparation process of the gel material. The process of applying a shear force may be implemented by using a stirring device as described above with reference to FIG. 5. It is preferable that the storage modulus G1 of the gel material according to the second embodiment is adjusted to a similar value to that of the above first embodiment.

C. Third Embodiment

Figure 14:
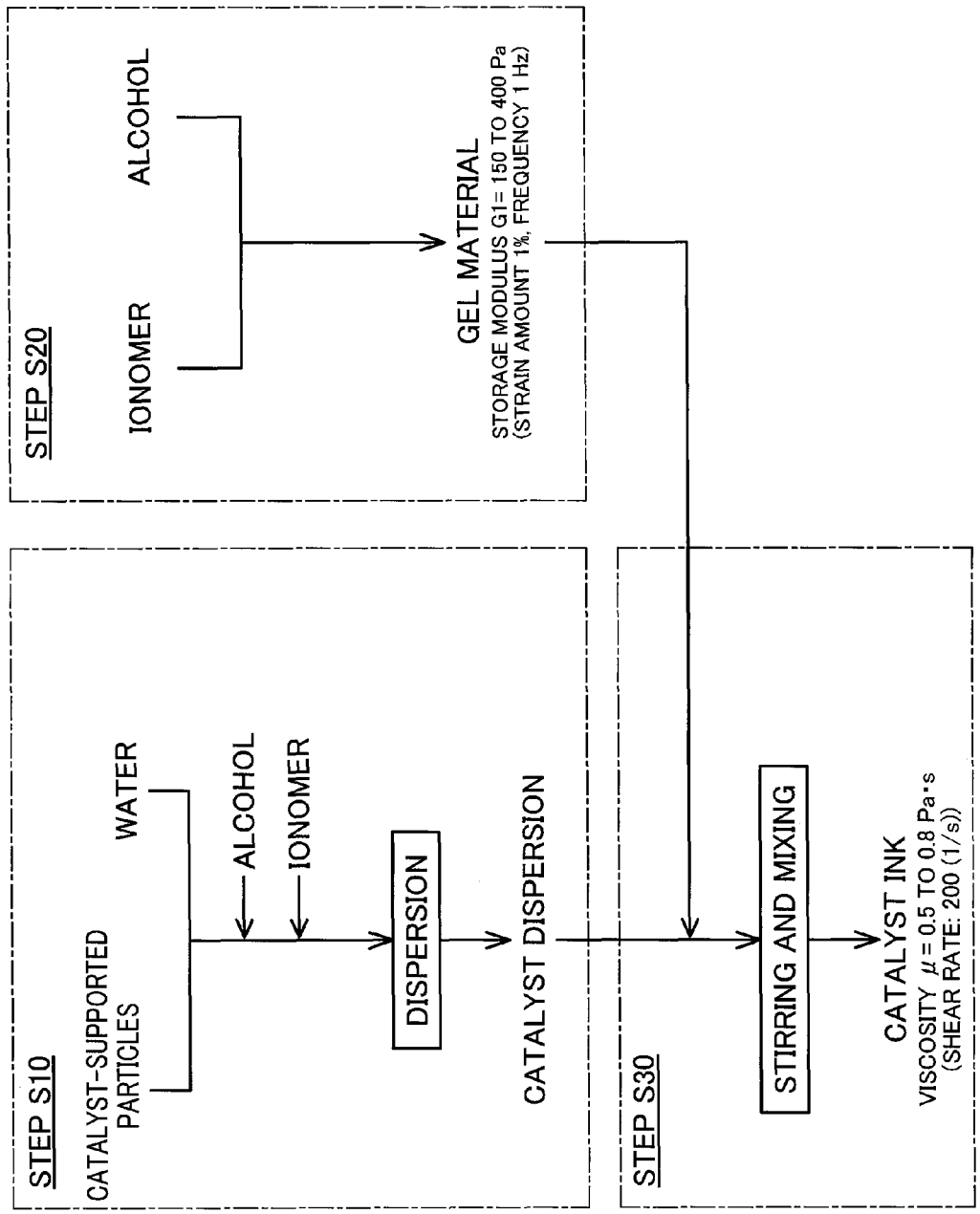
FIG. 14 is a diagram illustrating a manufacturing process of a catalyst ink according to a third embodiment.

FIG. 14 is a diagram illustrating a manufacturing process of a catalyst ink according to a third embodiment of the invention. FIG. 14 is similar to FIG. 3, except omission of thickening treatment of a mixed solution of an ionomer and a volatile solvent at step S20. The manufacturing process of the catalyst ink according to the third embodiment is similar to the manufacturing process described in the above first embodiment, except the description below.

The inventors of the present invention have found that addition of an alcohol to control the concentration of the alcohol in a mixed solution to be, for example, not less than 20 wt %, provides the mixed solution of an ionomer and the alcohol with viscoelasticity. The inventors have also found that the viscoelasticity is increased by further increasing the concentration of the alcohol in the mixed solution. Accordingly, the viscoelasticity of the gel material prepared at step S20 is adjustable by regulating the amount of the alcohol added in the preparation process of the gel material. It is also preferable that the storage modulus G1 of the gel material according to the third embodiment is adjusted to a similar value to that of the above first embodiment.

D. Fourth Embodiment

Figure 15:
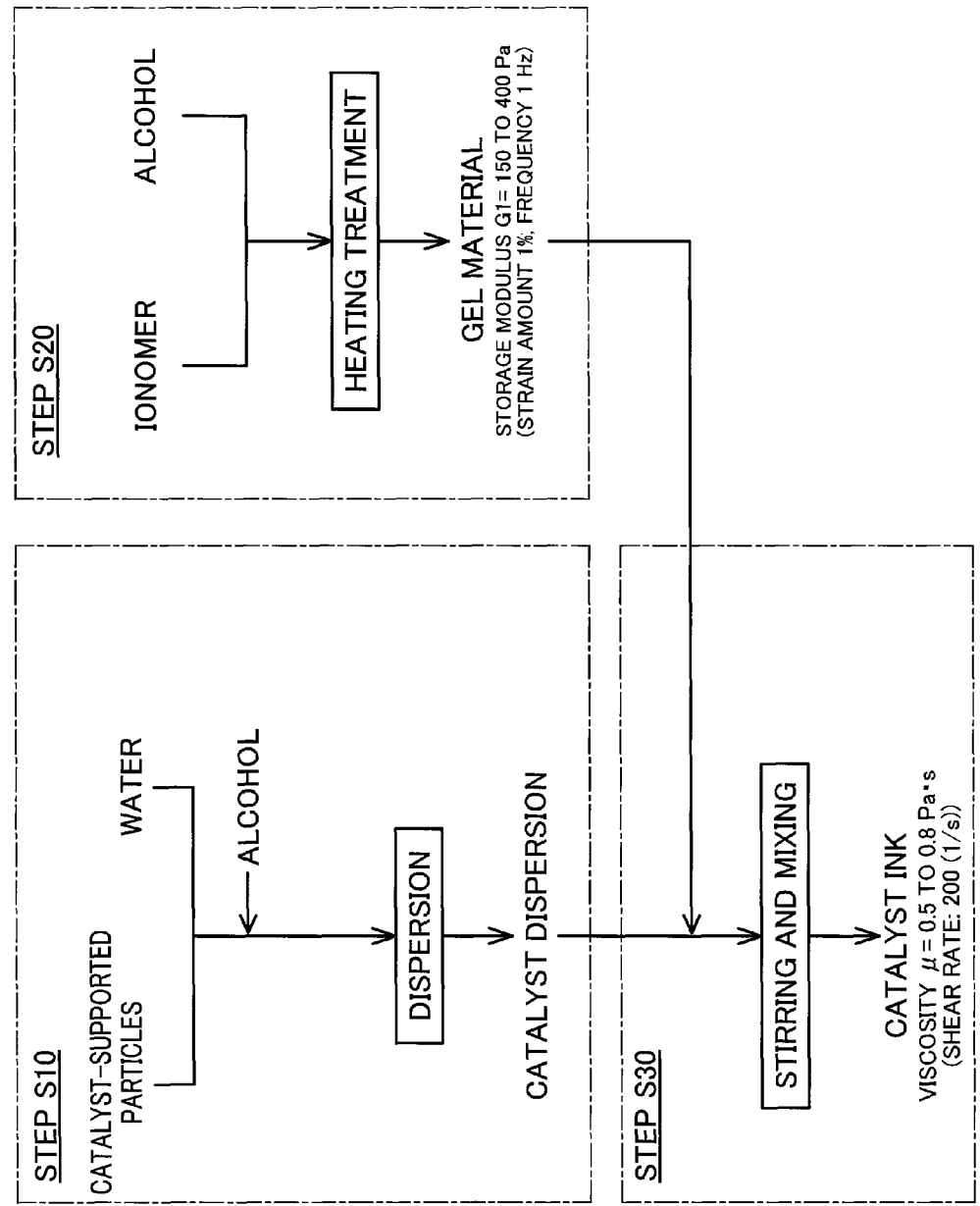
FIG. 15 is a diagram illustrating a manufacturing process of a catalyst ink according to a fourth embodiment.

FIG. 15 is a diagram illustrating a manufacturing process of a catalyst ink according to a fourth embodiment of the invention. FIG. 15 is similar to FIG. 3, except no addition of an ionomer to a catalyst dispersion at step S10. In the manufacturing process of the catalyst ink according to the fourth embodiment, a catalyst ink is produced by the similar process to that of the above first embodiment, except a catalyst dispersion is prepared without adding an ionomer as a surface active agent at step S10.

In the manufacturing process of the fourth embodiment, a catalyst ink having a desired viscosity is produced by mixing a catalyst dispersion in which catalyst-supported particles are dispersed with a gel material containing an ionomer. This catalyst ink also improves the permeability and the diffusivity of the reactive gas in the catalyst electrode as described above with reference to FIG. 6A to 6C. In the manufacturing process of the fourth embodiment, a surface active agent other than an ionomer may be added to the catalyst dispersion at step S10.

E. Fifth Embodiment

Figure 16:
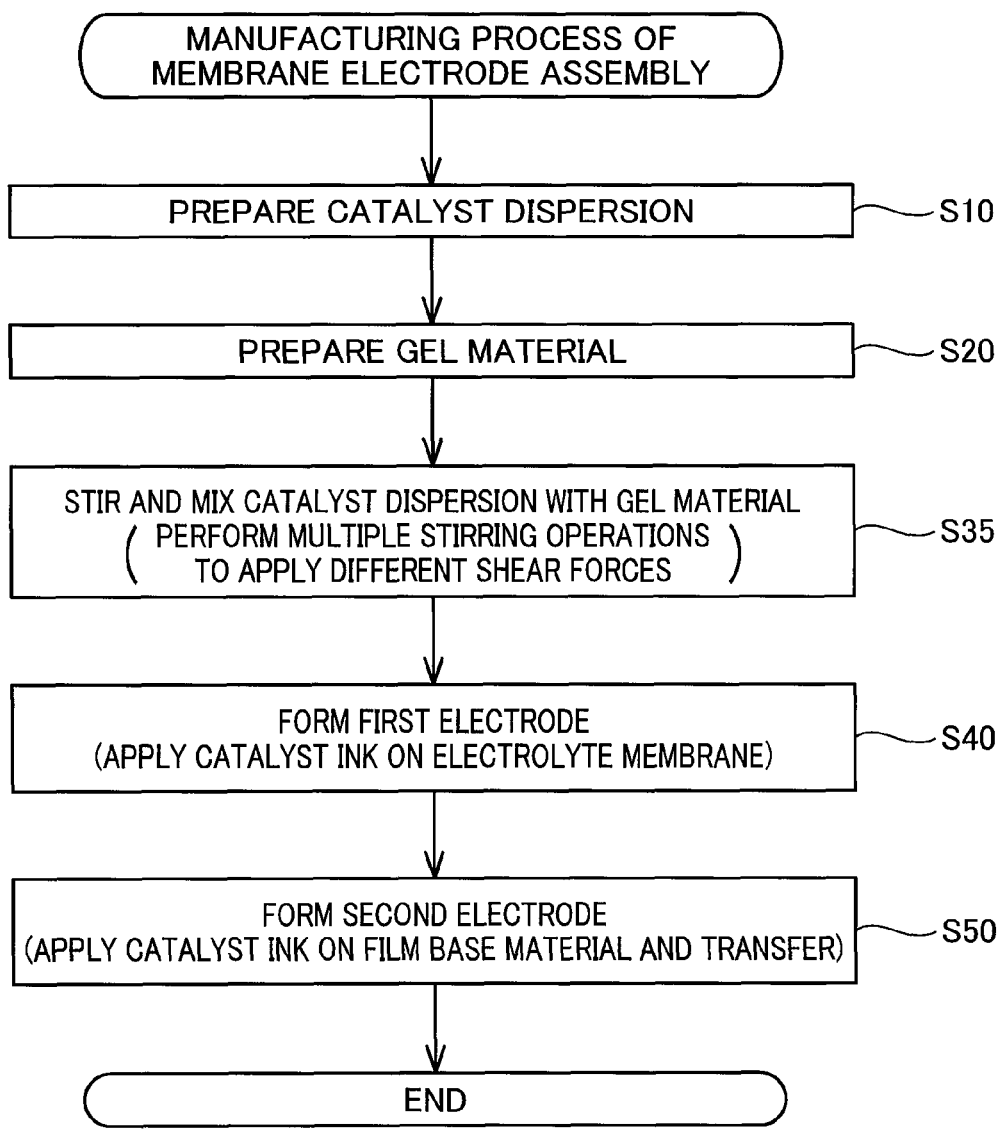
FIG. 16 is a diagram showing the procedure of a manufacturing process of a membrane electrode assembly according to a fifth embodiment.

FIG. 16 is a flowchart showing a manufacturing process of a membrane electrode assembly 5 according to a fifth embodiment of the invention. In the manufacturing process of the membrane electrode assembly 5 of the fifth embodiment, a catalyst dispersion and a gel material are stirred and mixed by multiple stages of stirring operations to apply different shear forces (step S35) in a manufacturing process of a catalyst ink. The following describes the details of the manufacturing process of the catalyst ink according to the fifth embodiment, while the process of steps S40 and S50 is similar to the above embodiment and is not specifically described here.

Figure 17:
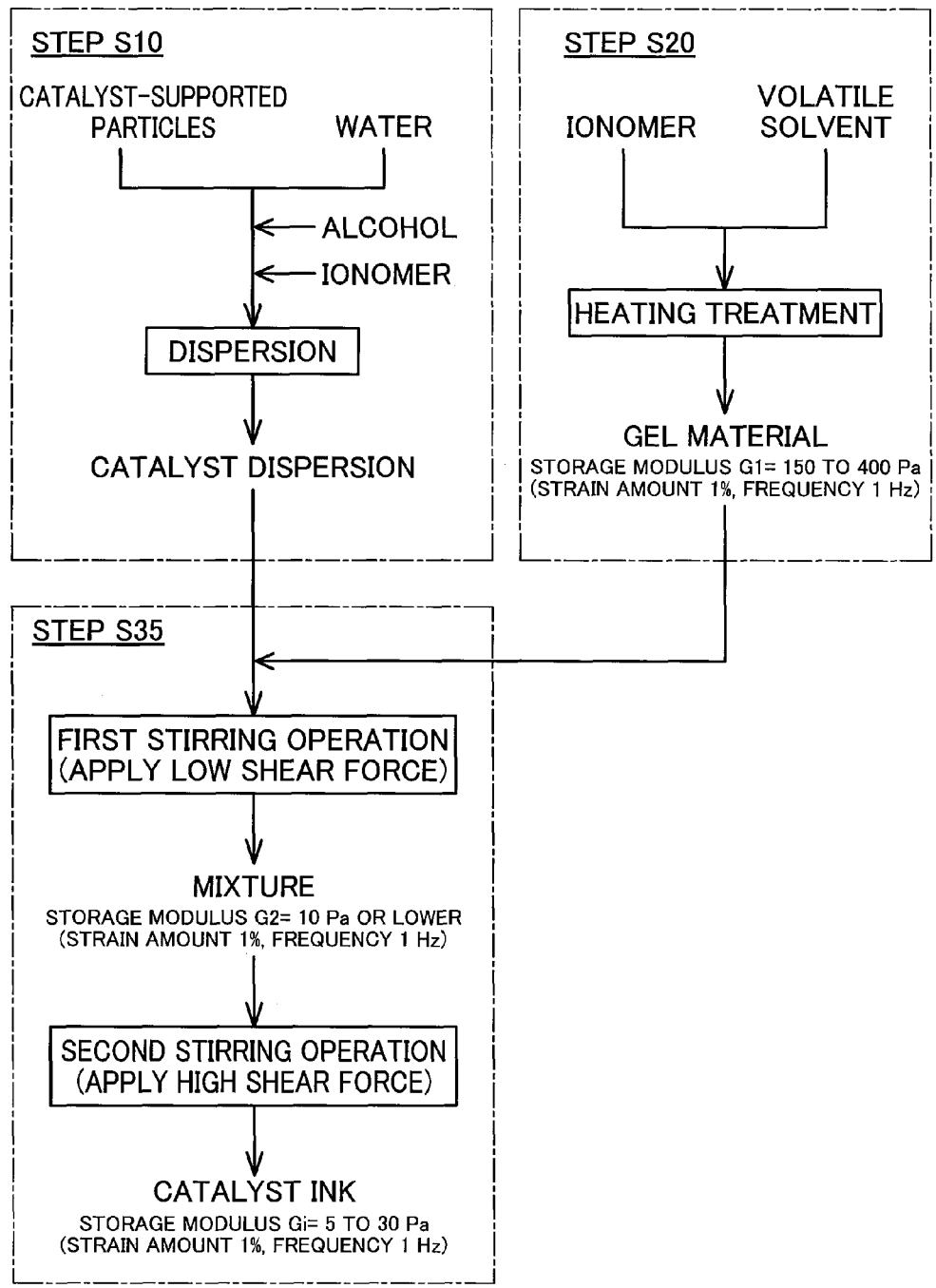
FIG. 17 is a diagram illustrating a manufacturing process of a catalyst ink according to the fifth embodiment.

FIG. 17 is a diagram illustrating the manufacturing process of the catalyst ink at steps S10 to S35 in detail. FIG. 17 is similar to FIG. 3, except that the process detail of step S30 is replaced by the process detail of step S35. At steps S10 and S20, a catalyst dispersion and a gel material are prepared by the same process as described in the first embodiment. The stirring process of a mixed solution at step S10 may be performed by using an ultrasonic disperser or a wet media stirring mill (bead mill). The thickening treatment of the mixed solution at step S20 is implemented by heating treatment, wherein the heating temperature is any temperature of not lower than 50° C.

At step S35, a first stirring operation is performed to mix the catalyst dispersion prepared at step S10 with the gel material of the storage modulus G1 prepared at step S20 and apply a low shear force to produce a mixture of the catalyst dispersion and the gel material having a specified storage modulus G2. This first stirring operation is performed to finely break up the gel material and disperse the gel material in the mixture. More specifically, for example, a stirring operation using an agitating blade in a helical shape may be performed as the first stirring operation. In the first stirring operation, the storage modulus G2 of the mixture becomes a relatively small value, accompanied with breakup and dispersion of the gel material.

At step S35, a second stirring operation is additionally performed to apply a high shear force to the mixture of the predetermined storage modulus G2 obtained by the first stirring operation and produce a catalyst ink having a specified storage modulus Gi. This second stirring operation is performed to further finely disperse the gel material and tangles the molecular chains of the high molecules constituting the gel material, thereby causing the resulting catalyst ink to have a specified viscoelasticity.

The second stirring operation may be performed by using, for example the stirring device 200 described in FIG. 5. More specifically, the second stirring operation supplies the mixture produced by the first stirring operation to the vessel 201 and further stirs the mixture by utilizing the centrifugal force generated by high-speed rotation of the rotor 211. As described previously, the second stirring operation tangles the molecular chains of the high molecules constituting the gel material, so that the storage modulus Gi of the catalyst ink obtained by this stirring operation is made higher than the storage modulus G2 of the mixture.

As described above, the manufacturing process of the catalyst ink according to the fifth embodiment performs the first stirring operation to finely disperse the gel material in the mixture and subsequently performs the second stirring operation at step S35. Accordingly this improves the dispersibility of the catalyst-supported particles and the ionomer including the trapped solvent molecules in the catalyst ink as described above with reference to FIG. 6A to 6C, thus improving the uniformity of power generation distribution in the catalyst electrode and the gas diffusivity in the catalyst electrode. The catalyst ink has the adequately adjusted storage modulus Gi and thereby has the improved coating properties.

The following describes the preferable process conditions at step S35. The storage moduli G2 and Gi described below are the measured values at the strain amount of 1% under application of vibration having the frequency of 1 Hz.

<Preferable Process Conditions of First Stirring Operation>

Rotation speed of agitating blade: 50 to 200 rpm;
Process time: about 1 to 2 hours; and
Storage modulus G2 of the prepared mixture: 0 Pa<G2≤10 Pa.

The first stirring operation decreases the storage modulus G2 of the mixture into the above preferable range, so as to adequately adjust the dispersibility of the gel material and improve the dispersibility of the catalyst-supported particles and the ionomer in the catalyst ink. The storage modulus G2 of the mixture may be adjusted by regulating the rotation speed of the agitating blade and the stirring time.

<Preferable Process Conditions of Second Stirring Operation>

Peripheral speed of rotor: 5 to 15 m/s
Process time: about 1 to 10 minutes
Storage modulus Gi of catalyst ink: 5 Pa≤Gi≤10 Pa Adjusting the storage modulus Gi of the catalyst ink into the above preferable range provides the preferable coating performance of the catalyst ink, while improving the dispersibility of the catalyst-supported particles and the ionomer. The storage modulus Gi of the catalyst ink may be adjusted by regulating the peripheral speed of the rotor, the process time and the mixture supply rate.

Figure 18:
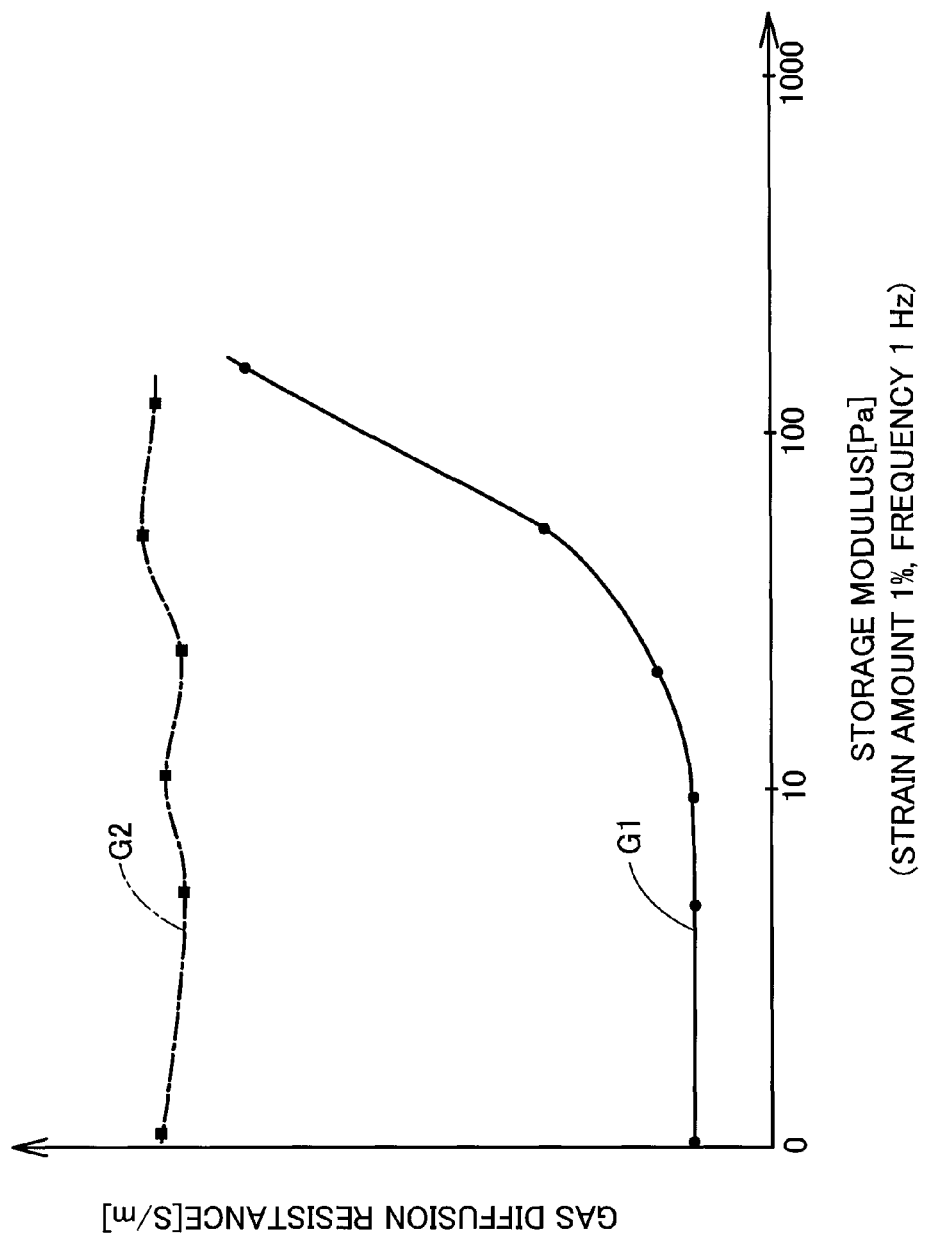
FIG. 18 is a diagram illustrating the results of an experiment to verify improvement of gas diffusivity in a catalyst electrode produced by using the catalyst ink obtained by the manufacturing process of the fifth embodiment.

FIG. 18 is a diagram illustrating the results of an experiment to verify improvement of the gas diffusivity in a catalyst electrode produced by using the catalyst ink obtained by the manufacturing process of the fifth embodiment. FIG. 18 shows a graph with the storage modulus in logarithmic expression as abscissa and the gas diffusion resistance as ordinate.

The inventors of the present invention manufactured a plurality of membrane electrode assemblies as examples of the present invention by using catalyst inks produced by changing the storage modulus G2 of the mixture according to a manufacturing process described below. The gas diffusion resistance in the catalyst electrode was measured by heliox method described below, with respect to each of the membrane electrode assemblies. FIG. 18 shows a solid-line graph G1 based on the measured values of the gas diffusion resistance against the storage modulus G2 of the mixture, with respect to the membrane electrolyte assemblies of the respective examples. The following describes the specific manufacturing conditions of the membrane electrode assemblies of the examples.

<Specific Manufacturing Process of Membrane Electrode Assemblies of Examples>

(1) Preparation of Catalyst Dispersion

After addition of distilled water to catalyst-supported particles of carbon with platinum cobalt (PtCo) supported thereon, a volatile solvent, such as ethanol or 1-propyl alcohol was added, and an ionomer as a surface active agent was subsequently added to have the weight ratio of 0.1 to 0.2 to the catalyst-supported particles. A catalyst dispersion was obtained by subsequently performing the dispersion operation with an ultrasonic disperser.

(2) Preparation of Gel Material

A mixed solution prepared by adding a volatile solvent such as ethanol or 1-propyl alcohol to an ionomer solution was heated at the temperature of not lower than 50° C. for at least about one hour, so that a gel material having the storage modulus G1 satisfying 150 Pa≤G1≤400 Pa was obtained.

(3) First Stirring Operation

The above gel material was mixed with the above catalyst dispersion to have the weight ratio of 0.5 to 0.8 to the catalyst-supported particles. Low shear forces were applied to the mixture by using an agitating blade in a helical shape, so that a plurality of mixtures having different storage moduli G2 were produced. The rotation speed of the agitating blade was controlled in the range of 50 to 200 rpm, and the stirring time was about 1 to 2 hours.

(4) Second Stirring Operation

A high shear force was applied to each of the mixtures obtained by the first stirring operation at the peripheral speed of 10 m/s for about 5 minutes by using Filmix manufactured by PRIMIX Corporation. The storage modulus Gi of each of the catalyst inks obtained by this operation was in the range of 5 to 30 Pa.

(5) Production of Catalyst Electrode

A catalyst electrode was produced by applying each of the catalyst inks obtained by the above process on a film base material of Teflon (registered trademark) by using a doctor blade applicator and subsequently heating and drying the catalyst ink at 100° C.

(6) Transfer of Catalyst Electrode to Electrolyte Membrane

The above catalyst electrodes were transferred from the film base material to both faces of a thin film of Nafion 112 by hot pressing at 130° C. to be joined with the think film.

<Measurement Method of Storage Modulus>

The storage modulus G2 of the mixture obtained by the first stirring operation was measured with a dynamic viscoelasticity measuring device manufactured by Anton-Paar. A measurement jig used was cone plate CP50-1.

<Measurement of Gas Diffusion Resistance by Heliox Method>

(1) Carbon fiber base materials with water repellent layers (PTFE) were placed as gas diffusion layers outside of the catalyst electrodes of the membrane electrode assembly as the measurement object;

(2) Electricity was generated by supplying hydrogen to the anode of the membrane electrode assembly and a mixed gas of the air and nitrogen or a mixed gas of the air and helium to the cathode at the humidity of 80% RH on both the electrodes;

(3) As the oxygen concentration in the supplied gas was decreased, the limit value of electric current that disables power generation was measured; and (4) The gas diffusion resistance in the catalyst electrode was calculated, based on the measurement results.

The inventors of the invention also produced a plurality of catalyst inks having different storage moduli as comparative examples by applying shear forces to a mixed solution of a catalyst dispersion prepared similarly by the above manufacturing process with an ionomer solution other than the gel material. Membrane electrode assemblies including catalyst electrodes produced by using the respective catalyst inks were produced as comparative examples, and the gas diffusion resistance in the catalyst electrode was measured by the above heliox method with respect to the respective membrane electrode assemblies.

The amounts of catalyst-supported particles and the ionomer contained in the catalyst inks of the comparative examples were the same as those in the catalyst inks of the above examples. The manufacturing process of the membrane electrode assemblies of the comparative examples was similar to the manufacturing process of the membrane electrode assemblies of the above examples, except the different manufacturing process of the catalyst ink. FIG. 18 also shows a one-dot chain line graph G2 based on the measured values of the gas diffusion resistance against the storage modulus Gi of the catalyst ink, with respect to the membrane electrolyte assemblies of the respective comparative examples.

As shown in the graph of FIG. 18, the membrane electrode assemblies of the examples, which were obtained by the process of performing both the first stirring operation and the second stirring operation for the mixed solutions of the catalyst dispersion and the gel material, consistently had the lower values of the gas diffusion resistance in the catalyst electrode than the membrane electrode assemblies of the comparative examples. This may be attributed to that pores improving the gas diffusivity are formed by volatilization of the trapped solvent molecules in the catalyst electrode produced by using the gel material as described above with reference to FIG. 6A to 6C.

In the membrane electrode assemblies of the examples, the gas diffusion resistance was maintained at the substantially constant minimum value when the storage modulus G2 of the mixture obtained by the first stirring operation was not greater than 10 Pa. The gas diffusivity in the catalyst electrode is improved by controlling the storage modulus G2 of the mixture obtained by the first stirring operation to satisfy 0 Pa<G2≤10 Pa.

As described above, the manufacturing process of the membrane electrode assembly according to the fifth embodiment mixed and stirred the catalyst dispersion with the gel material by the first stirring operation to apply a low shear force and by the second stirring operation to apply a high shear force. This improves the dispersibility of the catalyst-supported particles and the ionomer including the trapped solvent molecules in the catalyst ink, thus improving the gas diffusivity in the catalyst electrode and the power generation performance of the membrane electrode assembly.

F. Sixth Embodiment

Figure 19:
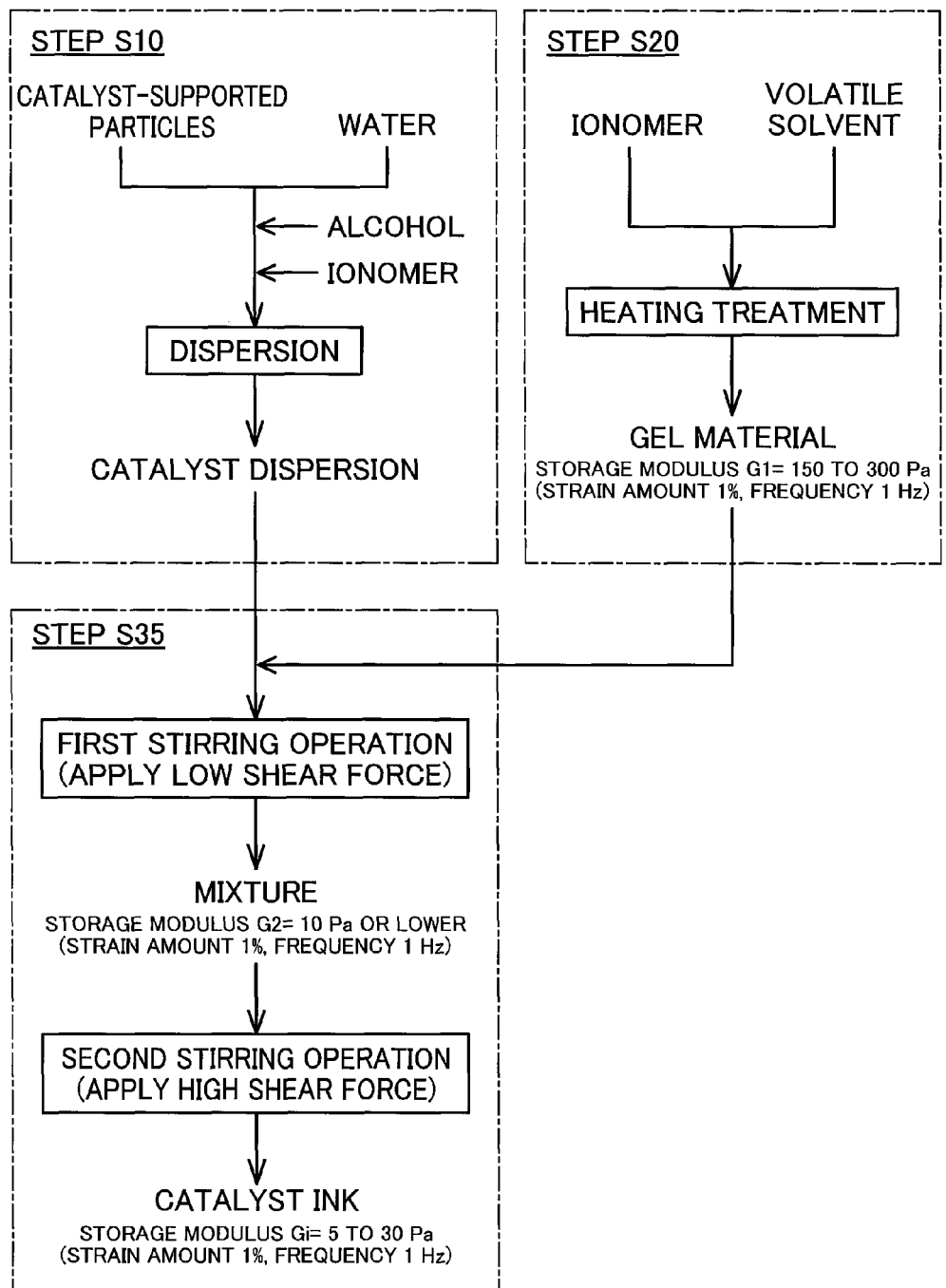
FIG. 19 is a diagram illustrating a manufacturing process of a catalyst ink according to a sixth embodiment.

FIG. 19 is a diagram illustrating a manufacturing process of a catalyst ink according to a sixth embodiment of the invention. FIG. 19 is similar to FIG. 17, except a different preferable range of the storage modulus G1 of a gel material prepared at step S20. The manufacturing process of the catalyst ink according to the sixth embodiment is similar to the manufacturing process described in the fifth embodiment, except the description below. The storage moduli described below are all measured values at the strain amount of 1% under application of vibration having the frequency of 1 Hz to the measurement object.

In the manufacturing process of the catalyst ink according to the sixth embodiment, the storage modulus G1 of the gel material prepared at step S20 is adjusted to satisfy:

150 Pa≤G1≤300 Pa.

This ensures the porosity in the catalyst electrode, while improving the dispersibility of pores in the catalyst electrode. Accordingly, this further effectively improves the gas diffusivity in the catalyst electrode and improves the power generation performance of the membrane electrode assembly.

Figure 20:
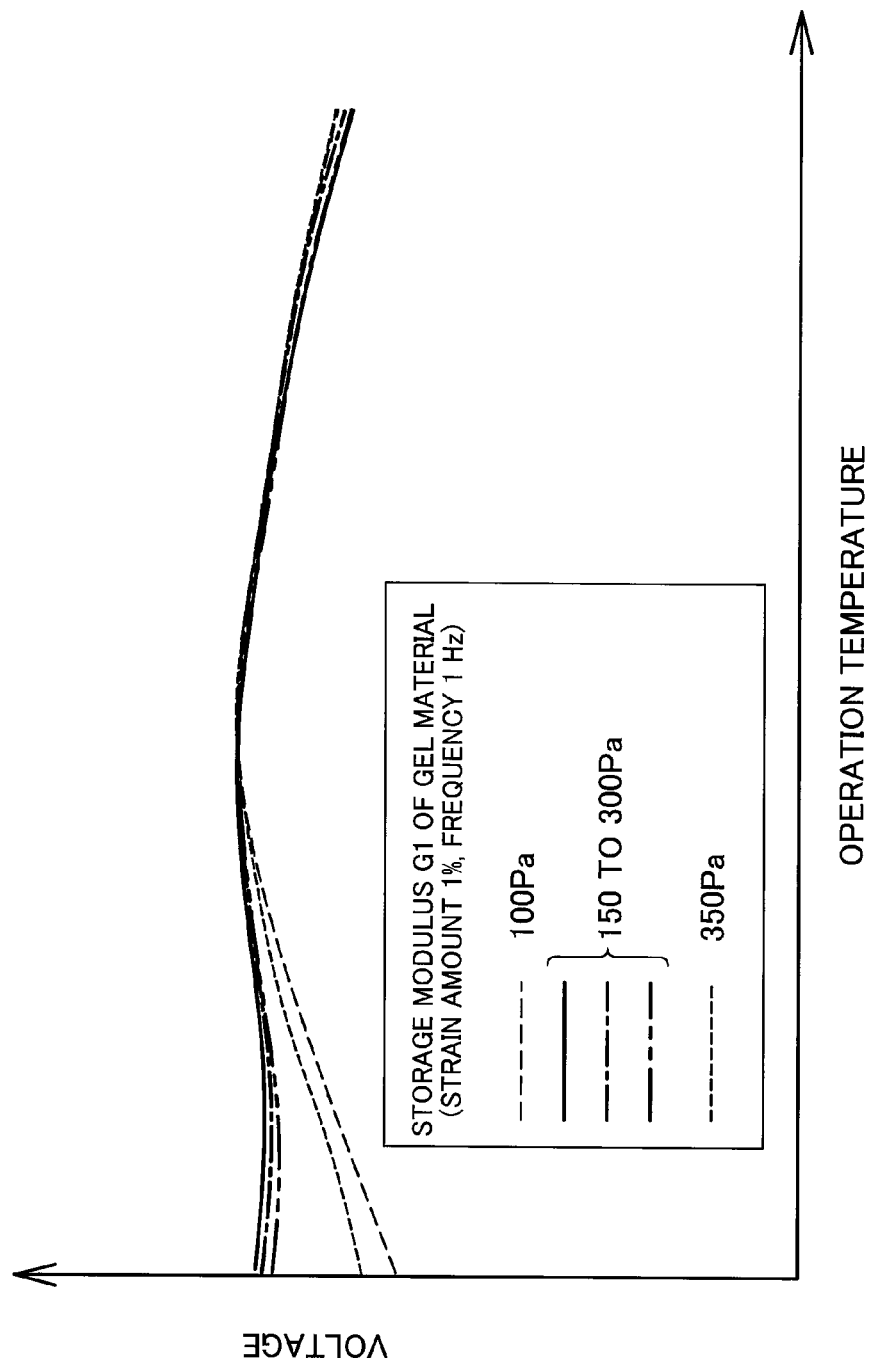
FIG. 20 is a diagram illustrating the results of an experiment to verify the power generation performance of a membrane electrode assembly produced by using the catalyst ink obtained by the manufacturing process of the sixth embodiment.

FIG. 20 is a diagram illustrating the results of an experiment to verify the power generation performance of a membrane electrode assembly produced by using the catalyst ink obtained by the manufacturing process of the sixth embodiment. FIG. 20 shows graphs of variation in output voltage against change in operation temperature during power generation at a constant current value, with respect to membrane electrode assemblies including catalyst electrodes produced by using gel materials having different storage moduli G1.

FIG. 20 shows graphs of the measurement results of membrane electrode assemblies produced by gel materials having the storage modulus G1 in the range of 150 to 300 Pa by solid line, one-dot chain line and two-dot chain line. FIG. 20 also shows graphs of the measurement results of membrane electrode assemblies including catalyst electrodes produced by gel materials having the storage modulus G1 equal to 100 Pa and 350 Pa by broken lines of different pitches.

<Manufacturing Conditions of Membrane Electrode Assembly>

Membrane electrode assemblies were manufactured as measurement objects by the similar process to the manufacturing process of the membrane electrode assemblies in examples described in the fifth embodiment. The storage modulus G1 of the gel material was adjusted by changing the heating temperature and the heating time in the thickening treatment.

<Measurement Method of Storage Modulus G1>

The storage modulus G1 of the gel material was the measured value at the strain amount of 1% under application of vibration having the frequency of 1 Hz by using a dynamic viscoelasticity measuring device manufactured by Anton-Paar. A measurement jig used was plate PP25.

<Power Generation Conditions of Membrane Electrode Assembly>

Carbon fiber base materials with water repellent layers (PTFE) were placed as gas diffusion layers outside of the catalyst electrodes of the membrane electrode assembly. Electricity was generated by supplying hydrogen to the anode and a mixed gas of the air and nitrogen or a mixed gas of the air and helium to the cathode at the humidity of 80% RH on both the electrodes.

In the membrane electrode assemblies using the gel materials having the storage modulus G1 equal to 100 Pa and 350 pa, the measured value of voltage gradually decreased with a decrease in operation temperature. In the membrane electrode assemblies using the gel materials having the storage modulus G1 in the range of 150 to 300 Pa, on the other hand, there were little variations in voltage even at the low operation temperatures. This is because the porosity and the dispersibility of pores in the catalyst electrode are sufficiently ensures in the latter membrane electrode assemblies and the diffusion of the reactive gas in the catalyst electrode is not interfered even when the operation temperature is decreased to increase the water content present as liquid water.

Figure 21:
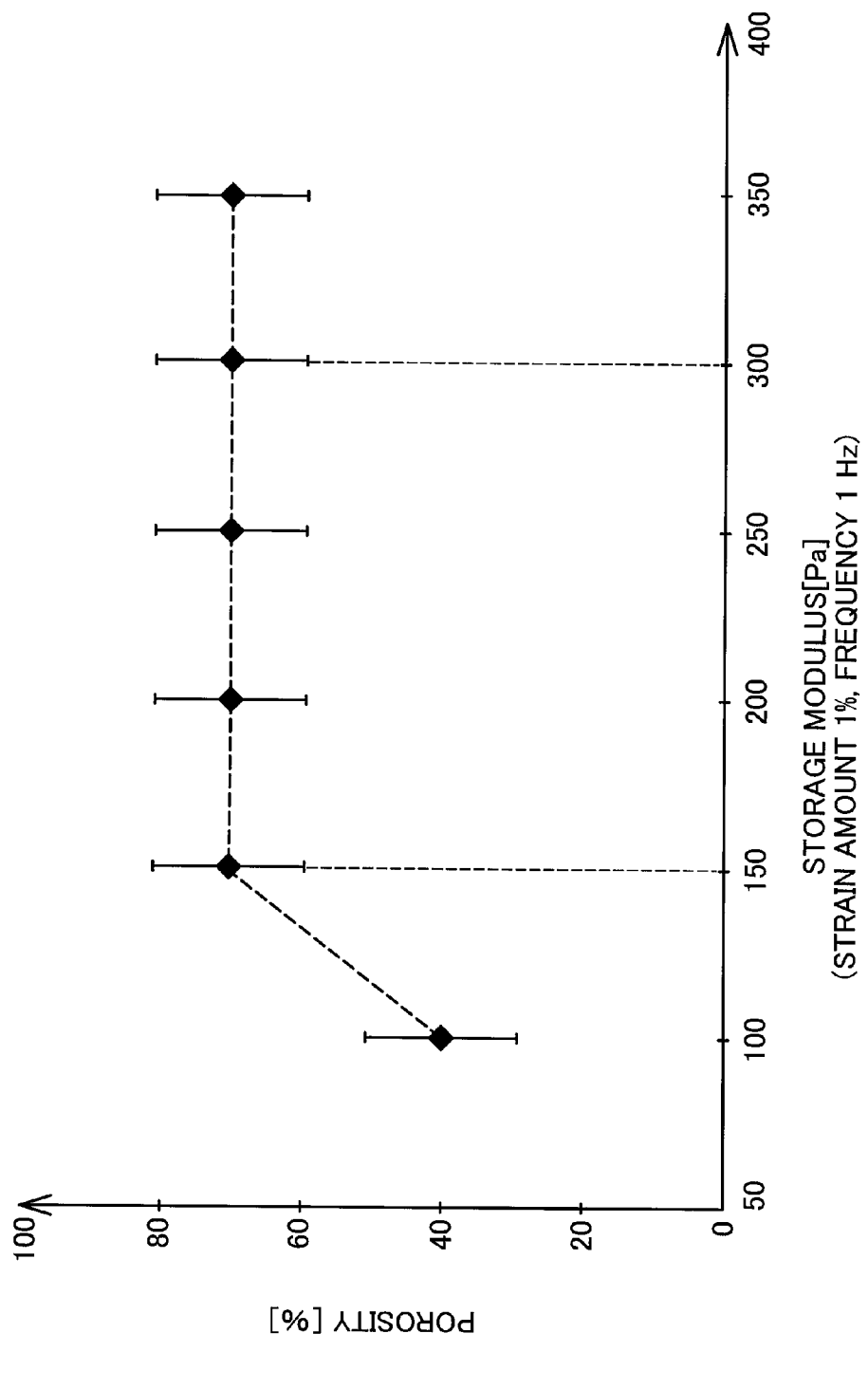
FIG. 21 is a diagram showing the experimentally obtained relationship between the storage modulus of a gel material and the porosity of a catalyst electrode.

FIG. 21 is a diagram showing the experimentally obtained relationship between the storage modulus G1 of a gel material and the porosity of the catalyst electrode produced by the gel material. FIG. 21 shows a graph with the storage modulus G1 of the gel material as abscissa and the porosity of the catalyst electrode as ordinate. In the graph of FIG. 21, the error range of about ±10 is shown with respect to each measured value of the porosity.

The inventors of the present invention measured the porosity of the catalyst electrode by the following procedure with respect to each of the membrane electrode assemblies produced in the above experiment. The storage modulus G1 of the gel material was the measured value of each membrane electrode assembly in the above experiment.

<Measurement Method of Porosity>

The thickness of the catalyst electrode was measure by using a contact-type thickness meter, and the density of the catalyst electrode was calculated. The porosity of the catalyst electrode was then calculated, based on the specific gravity to the constituents of the catalyst electrode such as the catalyst-supported particles and the ionomer.

In the catalyst electrodes formed from the catalyst inks including the gel materials having the storage modulus G1 of not less than 150 Pa, the porosity was substantially constant and was not less than 60%. In the catalyst electrodes formed from the catalyst ink including the gel material having the storage modulus G1 of less than 150 Pa, on the other hand, the porosity was significantly decreased to about 40%. These results show that the catalyst ink produced by using the gel material having the storage modulus G1 of not less than 150 Pa ensures the porosity in the catalyst electrode.

FIG. 22 is a diagram showing photographic images of the surfaces of catalyst electrodes produced by using gel materials having different storage moduli. FIG. 22 shows two typical photographic images of the catalyst electrodes included in the membrane electrode assemblies produced in the above experiment. More specifically, the upper image of FIG. 22 is the photographic image of a catalyst electrode using a gel material having the storage modulus G1 in the range of 100 to 300 Pa, and the lower image is the photographic image of a catalyst electrode using a gel material having the storage modulus G1 of 350 Pa.

The catalyst electrode produced by using the gel material having the storage modulus G1 of not greater than 300 Pa had the relatively flat, homogeneous surface. In the catalyst electrode produced by using the gel material having the storage modulus G1 of 350 Pa, on the other hand, dispersion of granular ionomer masses MI of the solidified gel material were observed on the surface. The presence of such ionomer masses MI cause the reduced diffusivity of the reactive gas, the non-uniform power generation distribution in the catalyst electrode and the increased contact resistance between the catalyst electrode and the separator in the assembled fuel cell.

As described above, it is more preferable that the storage modulus G1 of the gel material prepared in the manufacturing process of the catalyst ink satisfies:

$$150 \text{ Pa} \leq G1 \leq 300 \text{ Pa}.$$

This sufficiently ensures the porosity in the catalyst electrode and the dispersibility of the ionomer and the pores in the catalyst electrode, thus improving the power generation performance of the membrane electrode assembly.

G. Seventh Embodiment

Figure 23:
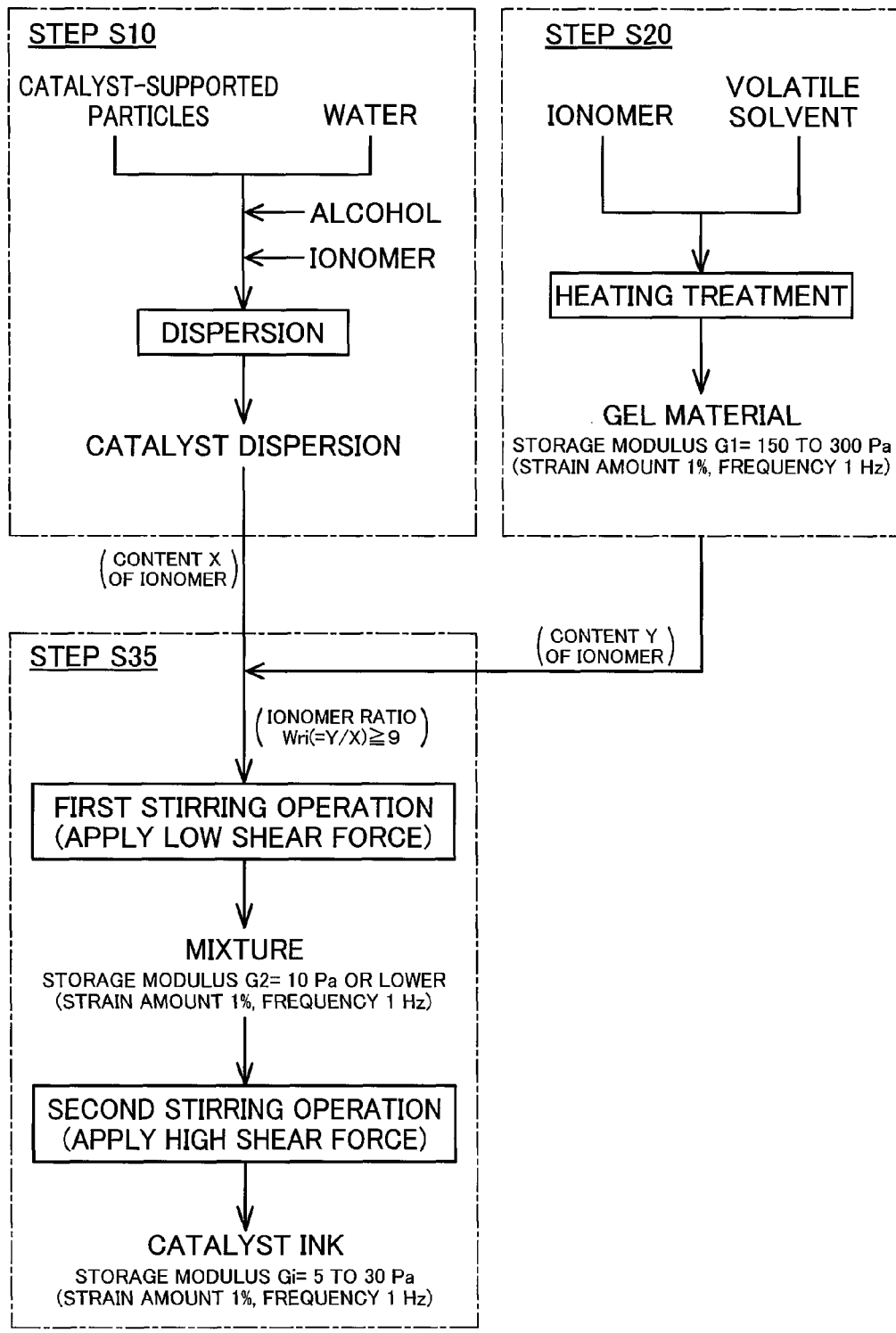
FIG. 23 is a diagram illustrating a manufacturing process of a catalyst ink according to a seventh embodiment.

FIG. 23 is a diagram illustrating a manufacturing process of a catalyst ink according to a seventh embodiment of the invention. FIG. 23 is similar to FIG. 19, except additional description of an ionomer ratio Wri described later. The manufacturing process of the catalyst ink according to the seventh embodiment is similar to the manufacturing process described in the sixth embodiment, except the description below.

As described in the above embodiment, an ionomer as a surface active agent is added in the process of preparing a catalyst dispersion at step S10, and a gel material is prepared by using an ionomer solution at step S20. The inventors of the present invention have found that it is preferable to mix the catalyst dispersion with the gel material at step S35, such that a ratio Wri (hereinafter referred to as "ionomer ratio") of weight Y of the ionomer included in the gel material to weight X of the ionomer included in the catalyst dispersion is not less than 9:

$$Wri(=X/Y) \geq 9$$

For example, when the catalyst electrode has cracking, there is a high possibility that fluff of the fiber base material forming the gas diffusion layer may enter the cracking and damage the electrolyte membrane in the assembled fuel cell. On the cathode side of the membrane electrode assembly, it is likely to increase the amount of hydrogen permeated from the anode side at the location of the cracking and produce hydrogen peroxide as the substance responsible for degradation of the electrolyte membrane. The occurrence of cracking in the catalyst electrode is, however, suppressed as described below by mixing the catalyst dispersion and the gel material at the above ionomer ratio Wri to produce the catalyst ink and ensuring the amount of the ionomer to be added as the gel material to the catalyst ink.

As described in the above first embodiment, in order to sufficiently accelerates the dispersion of the catalyst-supported particles, the mass of the ionomer added at step S10 is not less than 10% of the mass of the ionomer included in the catalyst ink (inequalities (3a) and (3a') above). Even in the case of an insufficient amount of the ionomer as the surface active agent, however, the dispersibility of the catalyst-supported particles in the catalyst dispersion may be ensured by regulating the stirring power and the stirring amount in the stirring process during preparation of the catalyst dispersion.

More specifically, even when the amount of the ionomer added at step S10 is less than the preferable range shown by the above inequalities (3a) and (3a'), the dispersibility of the catalyst-supported particles in the catalyst dispersion may be ensured by the stirring process at step S10. In the manufacturing process of the seventh embodiment, the occurrence of cracking in the catalyst electrode is suppressed by adding a specific amount of the ionomer satisfying the above inequality (4) as the gel material to the catalyst ink at step S10. The dispersibility of the catalyst-supported particles in the catalyst dispersion is, on the other hand, ensured by the stirring process of the catalyst dispersion.

Figure 24:
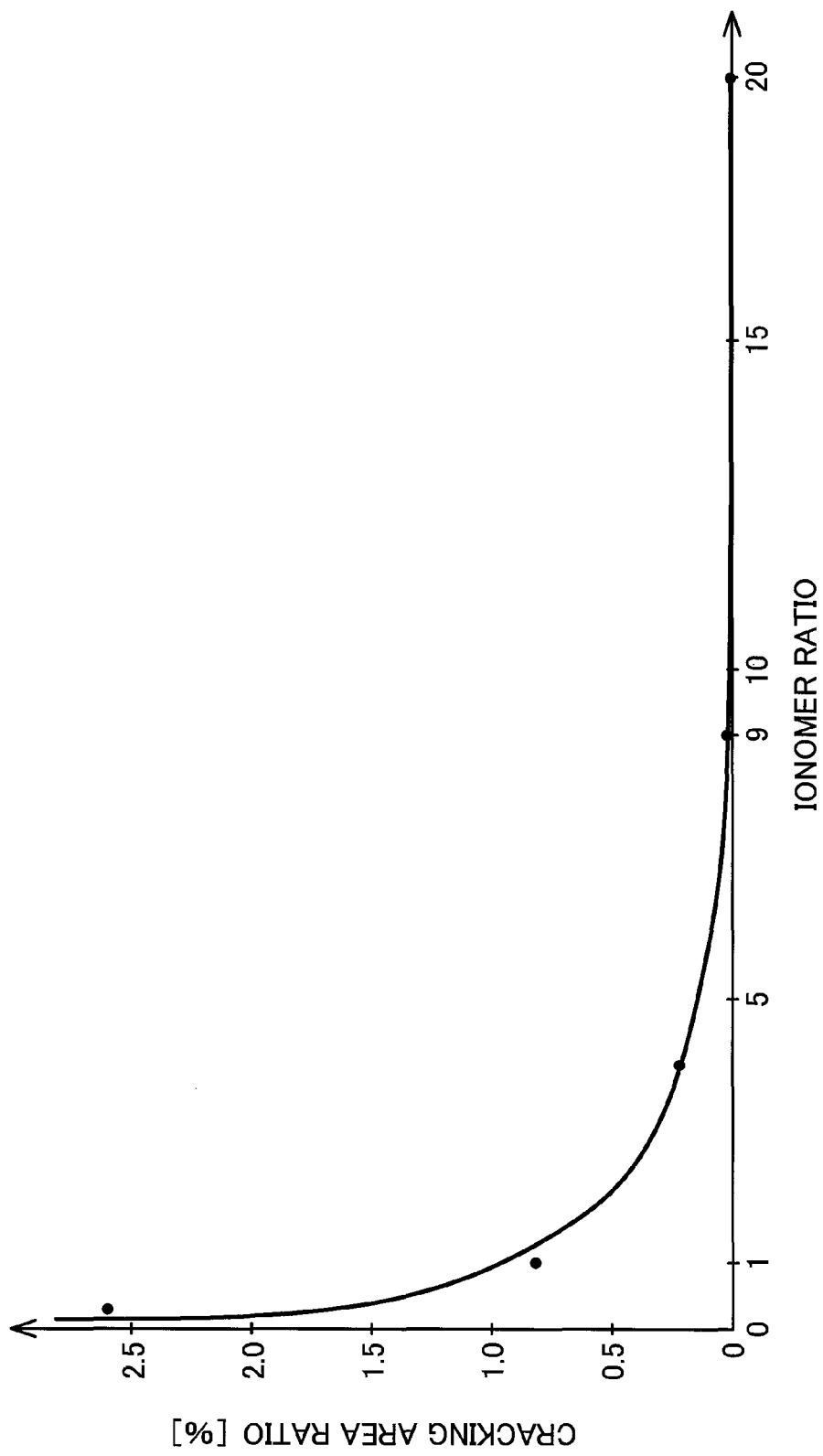
FIG. 24 is a diagram showing the experimentally obtained relationship between the ionomer ratio and the occurrence degree of cracking in a catalyst electrode.

FIG. 24 is a diagram showing the experimentally obtained relationship between the ionomer ratio Wri in production of the catalyst ink and the occurrence degree of cracking in the catalyst electrode. FIG. 24 shows a graph with the ionomer ratio Wri as abscissa and the cracking area ratio representing the occurrence degree of cracking in the catalyst electrode as ordinate. The "cracking area ratio" herein means a ratio of the area of cracking occurring in the catalyst electrode to the entire area of the catalyst electrode.

The inventors of the present invention produced membrane electrode assemblies of examples and measured the cracking area ratio in the catalyst electrodes as described below. The process after production of the catalyst ink (production process of the catalyst electrode and transfer process of the catalyst electrode to the electrolyte membrane) is similar to the process described in the manufacturing process of the membrane electrode assemblies as examples of the fifth embodiment and is thus not specifically described here.

<Manufacturing Process of Membrane Electrode Assemblies of Examples>

(1) Preparation of Catalyst Dispersion

After addition of distilled water to catalyst-supported particles of carbon with platinum cobalt (PtCo) supported thereon, a volatile solvent, such as ethanol or 1-propyl alcohol was added. An ionomer as a surface active agent was subsequently added at the weight of less than 10% relative to the weight of the ionomer eventually contained in the catalyst ink. A catalyst dispersion was obtained by subsequently performing the dispersion operation with an ultrasonic disperser or a bead mill.

(2) Preparation of Gel Material

A gel material was obtained by heating a mixed solution prepared by adding a volatile solvent such as ethanol or 1-propyl alcohol to an ionomer solution at the temperature of not lower than 50° C. for at least about one hour. The storage modulus G1 of the gel material was about 200 Pa.

(3) First Stirring Operation

A plurality of mixtures having a specified storage modulus G2 and different ionomer ratios Wri were obtained by mixing the above gel material with the above catalyst dispersion and applying a low shear force using an agitating blade in a helical shape. The rotation speed of the agitating blade was controlled in the range of 50 to 200 rpm, and the stirring time was about 1 to 2 hours.

(4) Second Stirring Operation

A catalyst ink of 70 g was obtained with respect to each mixture of the ionomer ratio Wr by applying a high shear force to each of the mixtures obtained by the first stirring operation at the peripheral speed of 10 m/s for about 5 minutes by using Filmix model 56-50 manufactured by PRIMIX Corporation. The storage modulus Gi of each of the catalyst inks obtained by this operation was in the range of 5 to 30 Pa.

<Measurement Method of Storage Modulus>

The storage modulus was measured at the strain amount of 1% under application of vibration having the frequency of 1 Hz by using a dynamic viscoelasticity measuring device manufactured by Anton-Paar. A measurement jig used for measurement of the storage modulus G1 of the gel material was plate PP25, and a measurement jig used for measurement of the storage modulus Gi of the catalyst ink was cone plate CP50-1.

As described in the graph of FIG. 24, the cracking area ratio in the catalyst electrode exponentially decreased at the ionomer ratio Wri in the range of 0 to 9. The cracking area ratio significantly decreased at the ionomer ratio Wri especially in the range of 0 to 1. The cracking area ratio converged substantially to zero at the ionomer ratio Wri of not less than 9. Mixing the catalyst dispersion with the gel material to have the ionomer ratio Wri of not less than 9 at step S35 suppresses the occurrence of cracking in the catalyst electrode.

FIGS. 25A and 25B are diagrams illustrating the reason why the occurrence of cracking in the catalyst electrode is suppressed by increasing the ionomer ratio Wri. In FIGS. 25A and 25B, the upper drawing illustrates a catalyst ink 25 applied on an electrolyte membrane 1 before being dried, and the lower drawing illustrates the catalyst ink 25 dried to form a catalyst electrode 27. FIG. 25A shows an example using the catalyst ink 25 of an extremely smaller ionomer ratio Wri than 9, and FIG. 25B shows an example using the catalyst ink 25 of the ionomer ratio Wri of not less than 9.

The catalyst ink 25 of the extremely smaller ionomer ratio Wri (FIG. 25A) contains a small amount of ionomer 21 added as the gel material, so that a relatively small number of the ionomer 21 forms tangles of molecular chains. Accordingly, in the dried catalyst ink 25, the ionomer 21 is contracted at a high rate, and a large amount of the ionomer 21 is adsorbed on the surface of the catalyst-supported particles 24. This facilitates the occurrence of cracking CR between the dispersedly located aggregates of the catalyst-supported particles 24 in the catalyst electrode 27 formed.

The catalyst ink 25 of the relatively large ionomer ratio Wri (FIG. 25B), on the other hand, contains a large number of the ionomer forming tangles of molecular chains as the gel material. This suppresses contraction of the ionomer 21 and adsorption of the ionomer 21 onto the surface of the catalyst-supported particles 24 in the dried catalyst ink 25, thus suppressing the occurrence of cracking in the catalyst electrode 27.

As described above, the manufacturing process of the seventh embodiment adequately ensures the amount of the ionomer mixed as the gel material in the catalyst ink. This suppresses the occurrence of cracking in the catalyst electrode and thereby suppresses deterioration of the electrolyte membrane in the fuel cell.

H. Modifications

The present invention is not limited to the embodiments or examples described above but may be implemented by various other aspects within the scope of the invention. For example, the materials other than those described in the above embodiments may be employed. For example, a material other than platinum may be used as the catalyst, and conductive particles other than carbon may be used as the carrier of the catalyst. A solution other than an alcohol solution may be used as the volatile solvent, and an alcohol other than n-propyl alcohol (e.g., ethanol) may be used as the alcohol. Additionally, the following describes some possible modifications.

H1. Modification 1

In the above embodiment, the first electrode 2 serving as the cathode is formed by directly applying the catalyst ink 25 on the electrolyte membrane 1, while the second electrode 3 serving as the anode is formed by transferring the coating film of the catalyst ink 25 formed on the film base material 402. These formation techniques of the first and the second electrodes 2 and 3 may be replaced with each other. Both the first and the second electrodes 2 and 3 may be formed by the same technique. More specifically, both the first and the second electrodes 2 and 3 may be formed by directly applying the catalyst ink on the electrolyte membrane or may be formed by transferring the coating film of the catalyst ink on the electrolyte membrane.

H2. Modification 2

The above embodiment uses the stirring device 200 (FIG. 5) to stir and mix the catalyst dispersion with the gel material. Stirring and mixing the catalyst dispersion with the gel material may not be implemented by using the stirring device 200 but may be implemented by another means. For example, a planetary mixer, a bead mill or a jet mill may be used for stirring and mixing. The stirring device 200, however, allows for efficient supply of the gel material and facilitates collection of the produced catalyst ink. The stirring device 200 also enables the stirring amount to be readily controlled by regulating the peripheral speed and the material supply rate.

H3. Modification 3

The above first to the third embodiments employ different techniques to provide the mixed solution of the alcohol and the ionomer with viscoelasticity and prepare the gel material. These techniques of the first to the third embodiments may, however, be combined to provide the mixed solution of the alcohol and the ionomer with viscoelasticity. For example, the mixed solution of the alcohol and the ionomer may be thickened by applying a shear force, along with heating. As another example, the viscoelasticity may be adjusted by heating the mixed solution, along with increasing the amount of the alcohol added to the mixed solution. Any other suitable method may be employed to thicken the mixed solution of the alcohol and the ionomer.

H4. Modification 4

In the above embodiment, the gel material is prepared by thickening the mixed solution of the ionomer and the volatile solvent. The mixed solution may, however, be mixed with the catalyst dispersion without the thickening process to the gel state. In other words, after the ionomer and the volatile solvent are mixed under heating, the mixed solution may be mixed with the catalyst dispersion. As another example, after the ionomer and the volatile solvent are mixed under application of a shear force, the mixed solution may be mixed with the catalyst dispersion.

H5. Modification 5

In the above embodiment, the ionomer added as the surface active agent to the catalyst dispersion is the same ionomer as the ionomer used for preparation of the gel material. The ionomer added to the catalyst dispersion and the ionomer used for the gel material may, however, not be the same ionomers but may be any similar types of ionomers having different structures but having equivalent ion conductivities and EW values. In this case, I/C is calculated from the total mass of such similar types of ionomers.

H6. Modification 6

In the above embodiment, the catalyst ink is produced by stirring and mixing the catalyst dispersion with the gel material. The catalyst ink may, however, be produced by additionally mixing an ionomer solution with the catalyst dispersion and the gel material.

H7. Modification 7

In the above embodiment, the catalyst ink is produced to provide the resulting catalyst electrode with I/C=1.0. The catalyst electrode may, however, have another value of I/C.

H8. Modification 8

In the above embodiment, the gel material is adjusted to have the desired viscoelasticity. The viscoelasticity of the gel material may not be adjusted. It is, however, preferable to adjust the viscoelasticity of the gel material, in order to improve the coating performance of the catalyst ink more effectively.

H9. Modification 9

In the above embodiment, the first electrode 2 is formed by the die-coat method. The first electrode 2 may alternatively be formed by spray method using a catalyst ink of low viscosity. In this case, the catalyst ink is preferably produced to have viscosity suitable for the spray method. A pore-forming agent may be added to the catalyst ink to make the first and the second electrodes 2 and 3 porous.

H10. Modification 10

In the manufacturing processes of the above fifth to the seventh embodiments, heating treatment is employed to thicken the mixed solution of the ionomer solution and the volatile solvent and prepare the gel material. The manufacturing processes of the above fifth to the seventh embodiments may, however, employ a technique other than the heating treatment to prepare the gel material. For example, the techniques described in the above second to the fourth embodiments may be employed for preparation of the gel material.

H11. Modification 11

The manufacturing processes of the above fifth to the seventh embodiments perform the first stirring operation to apply a low shear force and the second stirring operation to apply a high shear force at step S35. A greater number of stirring operations may be performed at step S35 to apply different shear forces in multiple stages.

H12. Modification 12

In the first to the fourth embodiments described above, the viscosity $\mu$ of the catalyst ink is adjusted to satisfy $0.5 \text{ Pa·s} \leq \mu \leq 0.8 \text{ Pa·s}$. In the above first to the fourth embodiments, however, the storage modulus Gi of the catalyst ink may be adjusted to satisfy $5 \text{ Pa} \leq Gi \leq 30 \text{ Pa}$ at the strain amount of 1% under application of vibration having the frequency of 1 Hz, like the above fifth to the seventh embodiments.

DESCRIPTION OF NUMBERS

1 an electrolyte membrane
1a an electrolyte membrane
2 a first electrode
3 a second electrode
5 a membrane electrode assembly
7 a first separators
8 a second separators
9 flow channels
10 unit cells
20 a gel material
21 an ionomer
22 mixing solvent molecules
22c trapped solvent molecules
24 catalyst-supported particles
25 a catalyst ink
25a a catalyst ink
26 remaining voids
27 a catalyst electrode
27a a catalyst electrode
100 a fuel cell
110 unit cells
200 a stirring device
201 a vessel
202 a bottom face
203 a side face
210 an agitation assembly
211 a rotor
212 stirring bars
213 a rotating shaft 214 a drive motor
221,222 first and second supply pipes
223 a delivery pipe
300 an exemplary coating device
301 an electrolyte membrane roll
305 a conveyor
306 conveying rollers
310 membrane supplying unit
311 a drive roller
320 an ink coating unit
321 a die coater
330 a drying unit
401 a die coater
402 a film base material
403 a coating film
MF a mixed fluid

The invention claimed is:

1. A manufacturing method of a catalyst ink used for formation of a catalyst electrode, the manufacturing method comprising steps of:
(a) dispersing catalyst-supported particles as conductive particles with a catalyst supported thereon in a solvent to prepare a catalyst dispersion;
(b) mixing an ionomer with a volatile solvent to prepare a gel material; and
(c) stirring and mixing the catalyst dispersion with the gel material to produce a catalyst ink,
wherein a storage modulus G1 of the gel material prepared in the step (b) satisfies: about 150 Pa≤G1≤about 400 Pa at a strain amount of 1% under application of vibration having a frequency of 1 Hz.

2. The manufacturing method according to claim 1, wherein
the step (a) comprises a step of adding a surface active agent to improve dispersibility of the catalyst-supported particles, and
the surface active agent is an ionomer that has a same structure as that of the ionomer used in the step (b) or has a different structure but has an equivalent ion conductivity and an equivalent EW value to the ionomer used in the step (b).

3. The manufacturing method according to claim 2, wherein
a ratio Wp of weight of the ionomer added to the catalyst dispersion in the step (a) to weight of the ionomer contained in the catalyst ink produced in the step (c) satisfies about 5%≤Wp≤about 25%.

4. The manufacturing method according to claim 1, wherein
the step (b) comprises a step of thickening the gel material by heating.

5. The manufacturing method according to claim 1, wherein
the step (b) comprises a step of thickening the gel material by applying a shear force.

6. The manufacturing method according to claim 1, wherein
the volatile solvent is an alcohol solution, and
the step (b) comprises a step of regulating concentration of an alcohol in the alcohol solution, so as to adjust viscoelasticity of the gel material.

7. The manufacturing method according claim 1, wherein a storage modulus G1 of the gel material prepared in the step (b) satisfies: about 125 Pa≤G1≤about 425 Pa at a strain amount of 1% under application of vibration having a frequency of 1 Hz.

8. The manufacturing method according to claim 1, wherein
the step (c) comprises steps of:
supplying the catalyst dispersion and the gel material into a vessel; and
applying a force toward a side face direction of the vessel to a mixed fluid of the catalyst dispersion and the gel material by utilizing a centrifugal force generated by a rotor rotating in the vessel, and stirring the mixed fluid in a state that the mixed fluid adheres in a film-like state on the side face, so as to adjust viscosity of the catalyst ink.

9. The manufacturing method according to claim 1, wherein
the step (c) includes multiple stirring operations to apply different shear forces to a mixture of the catalyst dispersion and the gel material.

10. The manufacturing method according to claim 9, wherein
the multiple stirring operations include a first stirring operation to apply a low shear force and a second stirring operation performed subsequent to the first stirring operation to apply a high shear force, wherein a storage modulus G2 of the mixture after the first stirring operation satisfies: about 0 Pa≤G2≤about 10 Pa at a strain amount of 1% under application of vibration having a frequency of 1 Hz.

11. The manufacturing method according to claim 10, wherein
a storage modulus G1 of the gel material prepared in the step (b) satisfies: about 150 Pa≤G1≤about 300 Pa at a strain amount of 1% under application of vibration having a frequency of 1 Hz.

12. The manufacturing method according to claim 2, wherein
the step (c) mixes the catalyst dispersion with the gel material, such that a ratio Wri of weight of the ionomer included in the gel material to weight of the ionomer included in the catalyst dispersion satisfies Wri≥about 9.

13. The manufacturing method according to claim 1, wherein
a storage modulus Gi of the catalyst ink produced in the step (c) satisfies: about 5 Pa≤Gi≤about 30 Pa at a strain amount of 1% under application of vibration having a frequency of 1 Hz.

14. A manufacturing method of a fuel cell, comprising:
applying the catalyst ink produced by the manufacturing method according to claim 1 by die-coat method to form a catalyst electrode.

15. A fuel cell, comprising:
a catalyst electrode formed by using the catalyst ink produced by the manufacturing method according to claim 1.

16. The manufacturing method according to claim 1, wherein a storage modulus G1 of the gel material prepared in the step (b) satisfies: about 150 Pa≤G1≤about 300 Pa at a strain amount of 1% under application of vibration having a frequency of 1 Hz.

* * * * *

UNITED STATES PATENT AND TRADEMARK OFFICE
CERTIFICATE OF CORRECTION

PATENT NO. : 9,865,885 B2
APPLICATION NO. : 14/241238
DATED : January 9, 2018
INVENTOR(S) : Yoshihiro Hori et al.

Page 1 of 1

It is certified that error appears in the above-identified patent and that said Letters Patent is hereby corrected as shown below:

In the Specification

At Column 11, Line 42, change the content from:
"$0.05 \times Ic/\alpha < Ia < 0.26 \times Ic$"
To:
"$0.05 \times Ic/\alpha < Ia < 0.25 \times Ic$"

At Column 26, Line 6, change the content from:
"$Wri(=X/Y) \geq 9$"
To:
"$Wri(=Y/X) \geq 9$"

Signed and Sealed this
Seventh Day of August, 2018

Andrei Iancu
*Director of the United States Patent and Trademark Office*